United States Patent
Yamagishi et al.

(10) Patent No.: US 11,453,128 B2
(45) Date of Patent: Sep. 27, 2022

(54) ROBOT CONTROL APPARATUS, CONTROL METHOD AND CONTROL PROGRAM

(71) Applicant: Sony Interactive Entertainment Inc., Tokyo (JP)

(72) Inventors: Takeshi Yamagishi, Kanagawa (JP); Norio Nagatsuka, Saitama (JP); Naoki Numaguchi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 258 days.

(21) Appl. No.: 16/623,489

(22) PCT Filed: Jun. 29, 2017

(86) PCT No.: PCT/JP2017/024052
§ 371 (c)(1),
(2) Date: Dec. 17, 2019

(87) PCT Pub. No.: WO2019/003401
PCT Pub. Date: Jan. 3, 2019

(65) Prior Publication Data
US 2020/0189110 A1    Jun. 18, 2020

(51) Int. Cl.
*B25J 19/02* (2006.01)
*B25J 9/16* (2006.01)
(Continued)

(52) U.S. Cl.
CPC .......... *B25J 9/1692* (2013.01); *B25J 9/0006* (2013.01); *B25J 9/1694* (2013.01); *B25J 19/02* (2013.01); *B62D 57/032* (2013.01)

(58) Field of Classification Search
CPC .... B62D 57/032; B62D 57/02; B62D 57/024; B25J 9/0006; B25J 17/00; B25J 5/00;
(Continued)

(56) References Cited

U.S. PATENT DOCUMENTS 6,243,623 B1 * 6/2001 Takenaka ............... B62D 57/02
                                                    180/8.1
6,920,374 B2 * 7/2005 Takenaka ............... B62D 57/02
                                                    318/568.1
(Continued)

FOREIGN PATENT DOCUMENTS

CN        1697723 A    11/2005
CN      104965120 A    10/2015
(Continued)

OTHER PUBLICATIONS

Garcia et al., Self Calibrating Procedure for a 3D Force Observer, 2005, IEEE, p. 6812-6817 (Year: 2006).*
(Continued)

*Primary Examiner* — McDieunel Marc
(74) *Attorney, Agent, or Firm* — Matthew B. Dernier, Esq.

(57) ABSTRACT

A control device for a robot includes a processor configured to implement: a function of obtaining a signal indicating a detected value of a sensor detecting a state quantity of the robot; and a function of, in converting the detected value to an estimated value of the state quantity according to a conversion function obtained by calibration of the sensor, applying an offset value compensating for a difference between the estimated value and the actual state quantity in a critical situation in operation of the robot.

12 Claims, 12 Drawing Sheets

(51) Int. Cl.
*B25J 9/00* (2006.01)
*B62D 57/032* (2006.01)

(58) Field of Classification Search
CPC ...... B25J 9/1648; B25J 13/088; B25J 13/085; Y10S 901/01; G01C 21/16
See application file for complete search history.

(56) References Cited

U.S. PATENT DOCUMENTS

| | | | | |
|---|---|---|---|---|
| 7,308,336 | B2* | 12/2007 | Takenaka | B62D 57/032 700/245 |
| 7,319,919 | B2* | 1/2008 | Takenaka | B25J 13/085 700/245 |
| 7,337,040 | B2* | 2/2008 | Takenaka | G01C 21/16 700/245 |
| 7,643,903 | B2* | 1/2010 | Kawai | B62D 57/032 700/245 |
| 8,805,584 | B2 | 8/2014 | Yamane | |
| 8,818,553 | B2* | 8/2014 | Orita | B62D 57/00 700/245 |
| 9,616,571 | B2 | 4/2017 | Yamaguchi | |
| 10,279,837 | B2 | 5/2019 | Minaki | |
| 2005/0075755 | A1* | 4/2005 | Takenaka | B62D 57/032 700/245 |
| 2005/0110448 | A1* | 5/2005 | Takenaka | B62D 57/032 318/568.12 |
| 2005/0228540 | A1 | 10/2005 | Moridaira | |
| 2006/0028164 | A1 | 2/2006 | Kono | |
| 2006/0200272 | A1 | 9/2006 | Kawai | |
| 2012/0259463 | A1* | 10/2012 | Orita | B62D 57/00 700/245 |
| 2013/0013186 | A1 | 1/2013 | Kon et al. | |
| 2013/0131865 | A1 | 5/2013 | Yamane | |
| 2015/0127153 | A1 | 5/2015 | Yamaguchi | |
| 2018/0257704 | A1 | 9/2018 | Minaki | |

FOREIGN PATENT DOCUMENTS

| | | |
|---|---|---|
| JP | 63121908 A | 5/1988 |
| JP | 07074963 B2 | 8/1995 |
| JP | 09265321 A | 10/1997 |
| JP | 2002048595 A | 2/2002 |
| JP | 2004314250 A | 11/2004 |
| JP | 2005088175 A | 4/2005 |
| JP | 2013107191 A | 6/2013 |
| JP | 2015089575 A | 5/2015 |
| WO | 2017033247 A1 | 3/2017 |
| WO | 2017061257 A1 | 4/2017 |

OTHER PUBLICATIONS

Garcia et al., Automatic Calibration Procedure for a Robotic Manipulator Force Observer, 2005, IEEE, p. 2703-2708 (Year: 2005).*
Kawamura et al., Encoderless robot motion control using vision sensor and back electromotive force, 2014, IEEE, p. 1609-1615 (Year: 2014).*
Censi et al., Simultaneous Calibration of Odometry and Sensor Parameters for Mobile Robots, 2013, IEEE, p. 475-492 (Year: 2013 ).*
International Search Report for corresponding of PCT/JP2017/024052, 4 pages, dated Sep. 12, 2017.
Notice of Reasons for Refusal for corresponding Application JP 2019-526080, 12 pages, dated Mar. 15, 2021.
International Preliminary Report on Patentability and Written Opinion for corresponding PCT Application PCT/JP2017/024052, 17 pages, dated Jan. 9, 2020.
Decision to grant a patent for corresponding Application JP 2019-526080, 4 pages, dated Mar. 31, 2022.
Office Action for corresponding CN Application 201780092363.4, 27 pages, dated Jun. 6, 2022.

* cited by examiner

ROBOT CONTROL APPARATUS, CONTROL METHOD AND CONTROL PROGRAM

TECHNICAL FIELD

The present invention relates to a control device for a robot, a control method, and a control program.

BACKGROUND ART

In controlling a robot, various sensors are used to detect state quantities of the robot. The state quantities detected by these sensors are, for example, input to a control device of the robot, and the control device controls operation of the robot according to the state quantities.

For example, PTL 1 describes a servo unit for a robot, the servo unit including: a driving motor; a reduction gear mechanism that reduces and transmits the rotational speed of the motor; an output shaft coupled to a final rotary shaft of the reduction gear mechanism; and a potentiometer that detects the rotational angle of the output shaft. The potentiometer is a sensor commonly used to detect a rotational angle in a joint portion of the robot, for example.

CITATION LIST

Patent Literature

[PTL 1] U.S. Patent Application Publication No. 2006/0028164

SUMMARY

Technical Problem

However, in a sensor such as the potentiometer or the like, a signal indicating a detected value, for example, does not linearly correspond to the state quantity. It is therefore necessary to perform calibration, and convert the signal indicating the detected value into the state quantity on the basis of a result of the calibration. Depending on a method of the calibration and a method of the conversion based on the result of the calibration, there is a possibility that the signal indicating the detected value is not converted into an accurate state quantity, and that it is therefore difficult to control the operation of the robot appropriately.

Accordingly, it is an object of the present invention to provide a new and improved control device for a robot, a control method, and a control program that, in converting the detected value of a sensor necessitating calibration into a state quantity of the robot, enable conversion of the detected value into an accurate state quantity by an effective method according to the operation of the robot.

Solution to Problem

According to a certain aspect of the present invention, a control device for a robot is provided. The control device includes a processor configured to implement: a function of obtaining a signal indicating a detected value of a sensor detecting a state quantity of the robot; and a function of, in converting the detected value to an estimated value of the state quantity according to a conversion function obtained by calibration of the sensor, applying an offset value compensating for a difference between the estimated value and the actual state quantity in a critical situation in operation of the robot.

According to another aspect of the present invention, a control method for a robot is provided. The control method includes: a step of obtaining a signal indicating a detected value of a sensor detecting a state quantity of the robot; and a step of, by a processor included in the robot, in converting the detected value to an estimated value of the state quantity according to a conversion function obtained by calibration of the sensor, applying an offset value compensating for a difference between the estimated value and the actual state quantity in a critical situation in operation of the robot.

According to yet another aspect of the present invention, a control program for a robot is provided. The control program makes a processor included in the robot implement: a function of obtaining a signal indicating a detected value of a sensor detecting a state quantity of the robot; and a function of, in converting the detected value into an estimated value of the state quantity according to a conversion function obtained by calibration of the sensor, applying an offset value compensating for a difference between the estimated value and the actual state quantity in a critical situation in operation of the robot.

According to the configuration of the present invention as described above, in converting the detected value of the sensor necessitating calibration into the state quantity of the robot, the detected value can be converted into an accurate state quantity by an effective method according to the operation of the robot.

DESCRIPTION OF EMBODIMENTS

Figure 1:
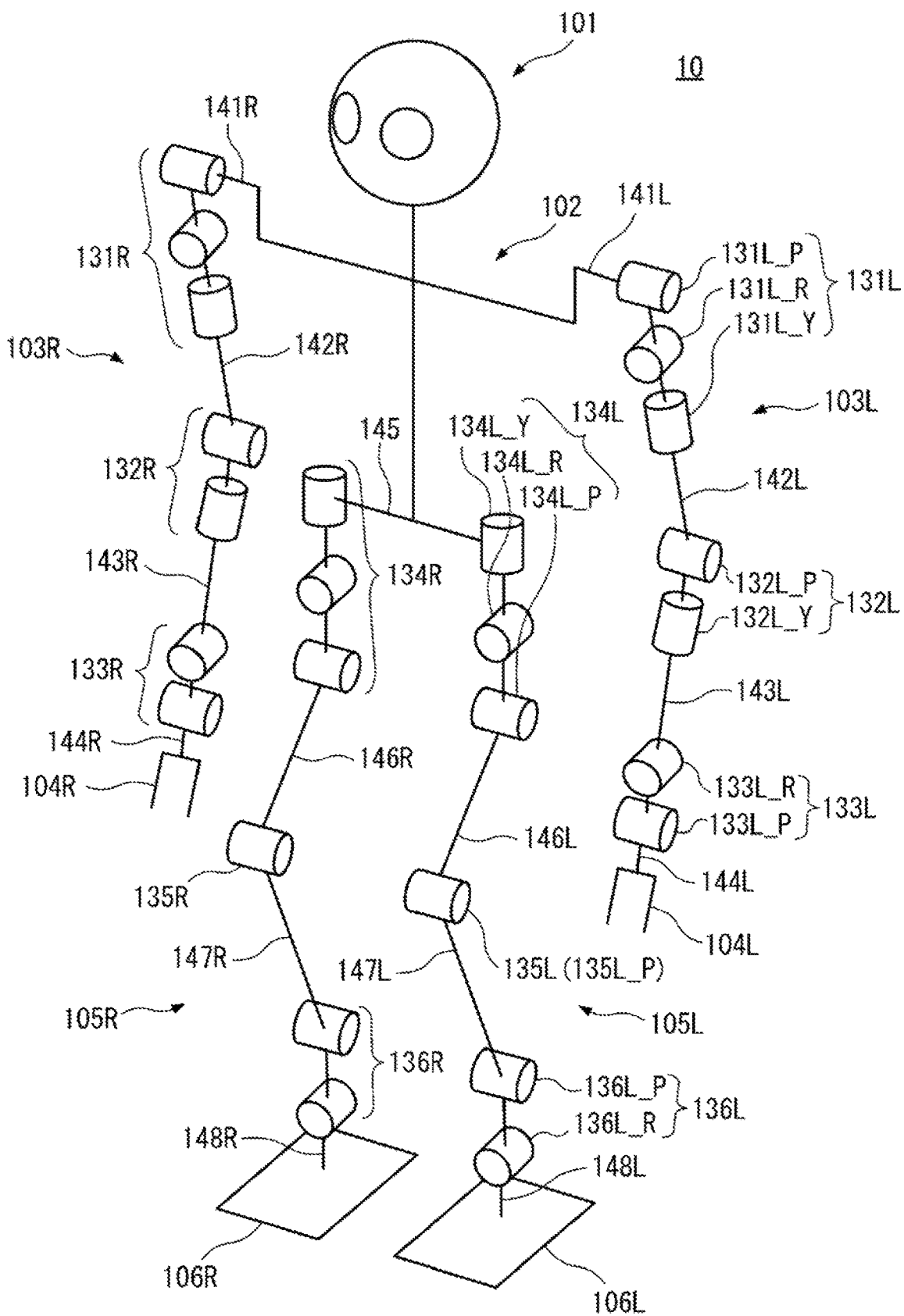
FIG. 1 is an illustrative diagram depicting a joint configuration of a robot according to one embodiment of the present invention.

A few embodiments of the present invention will hereinafter be described in detail with reference to the accompanying drawings. Incidentally, in the present specification and the drawings, constituent elements having essentially identical functional configurations are identified by the same reference numerals, and repeated description thereof will be omitted.

(Joint Configuration of Robot)

FIG. 1 is an illustrative diagram depicting a joint configuration of a robot according to one embodiment of the present invention. Referring to FIG. 1, a robot 10 according to one illustrative embodiment of the present invention includes a head portion 101, a main body portion 102, a pair of arm portions 103L and 103R, a pair of hand portions 104L and 104R, a pair of leg portions 105L and 105R, and a pair of foot portions 106L and 106R. Each of these parts includes a joint portion and a link coupled to the joint portion. The link relatively rotates about the joint portion. Various kinds of operation of the robot 10 are thereby realized.

In the illustrated example, the left arm portion 103L includes a shoulder joint portion 131L, an elbow joint portion 132L, and a wrist joint portion 133L. The shoulder joint portion 131L is located between a shoulder link 141L coupled to the main body portion 102 and an upper arm link 142L. The shoulder joint portion 131L enables relative rotation of the link 142L with respect to the link 141L. More specifically, the joint portion 131L includes a pitch joint portion 131L_P enabling pitch rotation, a roll joint portion 131L_R enabling roll rotation, and a yaw joint portion 131L_Y enabling yaw rotation. Incidentally, in the present specification, rotational axes (pitch, roll, and yaw) are defined with the upright posture of the robot 10 as a reference. The structure of such a joint portion 131L enables the upper arm link 142L to rotate in each direction with respect to the shoulder link 141L.

Similarly, the elbow joint portion 132L is located between the upper arm link 142L and a forearm link 143L. The elbow joint portion 132L includes a pitch joint portion 132L_P enabling pitch rotation and a yaw joint portion 132L_Y enabling yaw rotation. The structure of such a joint portion 132L enables the forearm link 143L to rotate in a pitch direction and a yaw direction with respect to the upper arm link 142L. In addition, the wrist joint portion 133L is located between the forearm link 143L and a wrist link 144L coupled to the hand portion 104L. The wrist joint portion 133L includes a roll joint portion 133L_R enabling roll rotation and a pitch joint portion 133L_P enabling pitch rotation. The structure of such a joint portion 133L enables the wrist link 144L to rotate in a roll direction and a pitch direction with respect to the forearm link 143L.

In addition, in the illustrated example, the left leg portion 105L includes a crotch joint portion 134L, a knee joint portion 135L, and an ankle joint portion 136L. The crotch joint portion 134L is located between a waist link 145 coupled to the main body portion 102 and a thigh link 146L. The crotch joint portion 134L enables relative rotation of the link 146L with respect to the link 145. More specifically, the joint portion 134L includes a yaw joint portion 134L_Y enabling yaw rotation, a roll joint portion 134L_R enabling roll rotation, and a pitch joint portion 134L_P enabling pitch rotation. The structure of such a joint portion 134L enables the thigh link 146L to rotate in each direction with respect to the waist link 145.

Similarly, the knee joint portion 135L is located between the thigh link 146L and a crus link 147L. The knee joint portion 135L includes a pitch joint portion 135L_P enabling pitch rotation. The structure of such a joint portion 135L enables the crus link 147L to rotate in a pitch direction with respect to the thigh link 146L. In addition, the ankle joint portion 136L is located between the crus link 147L and an ankle link 148L coupled to the foot portion 106L. The ankle joint portion 136L includes a pitch joint portion 136L_P enabling pitch rotation and a roll joint portion 136L_R enabling a roll joint portion. The structure of such a joint portion 136L enables the ankle link 148L to rotate in a pitch direction and a roll direction with respect to the crus link 147L.

Incidentally, in the illustrated example, the configuration of the right arm portion 103R and the right leg portion 105R is similar to the configuration of the left arm portion 103L and the left leg portion 105L described above, and therefore repeated description thereof will be omitted. Specifically, the right arm portion 103R includes a shoulder joint portion 131R coupled to a shoulder link 141R, an upper arm link 142R coupled to the shoulder joint portion 131R, an elbow joint portion 132R coupled to the upper arm link 142R, a forearm link 143R coupled to the elbow joint portion 132R, a wrist joint portion 133R coupled to the forearm link 143R, and a wrist link 144R coupled to the wrist joint portion 133R and the hand portion 104R. The right leg portion 105R includes a crotch joint portion 134R coupled to the waist link 145, a thigh link 146R coupled to the crotch joint portion 134R, a knee joint portion 135R coupled to the thigh link 146R, a crus link 147R coupled to the knee joint portion 135R, an ankle joint portion 136R coupled to the crus link 147R, and an ankle link 148R coupled to the ankle joint portion 136R and the foot portion 106R.

(Hardware Configuration of Robot)

Figure 2:
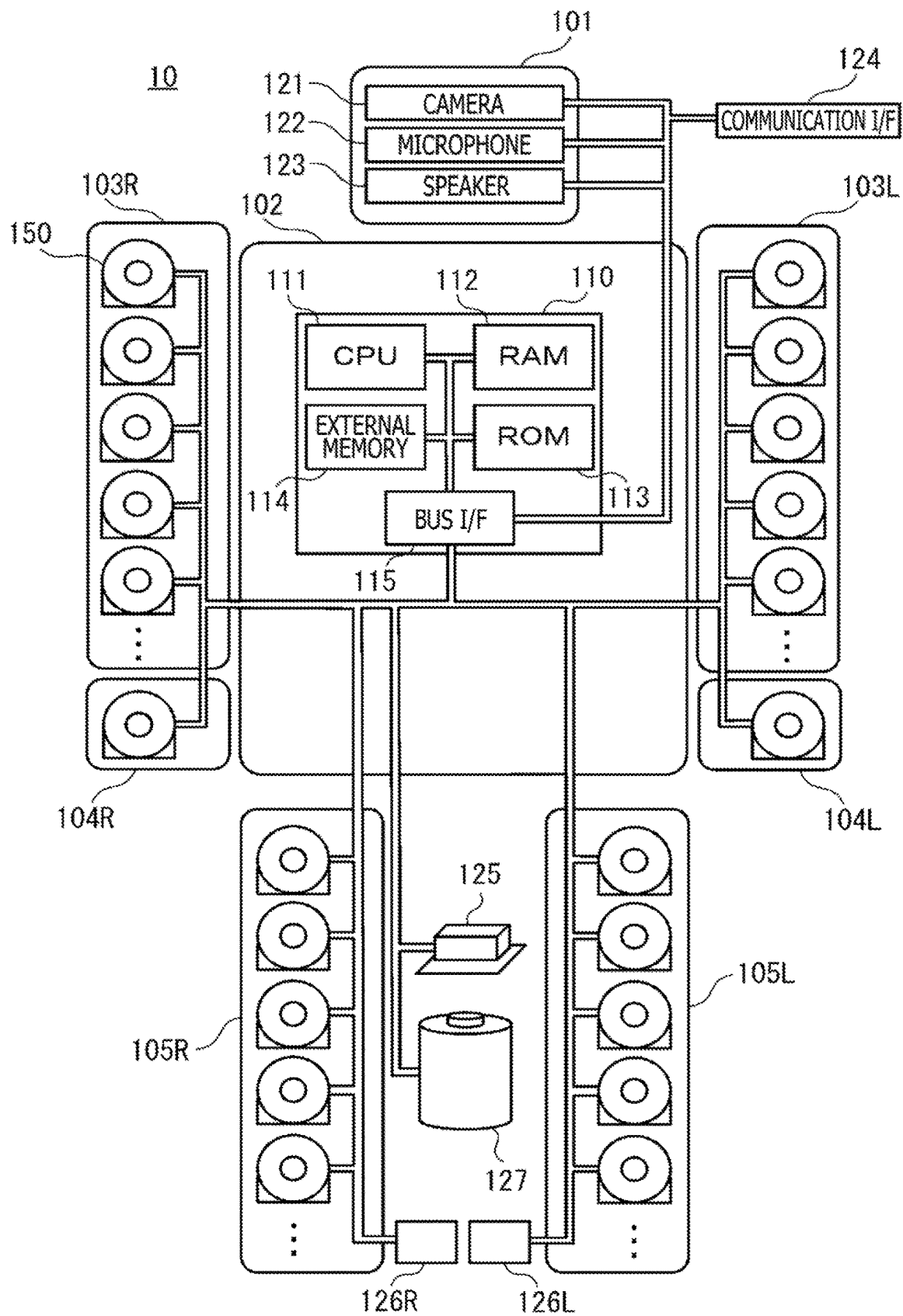
FIG. 2 is an illustrative diagram depicting a hardware configuration of the robot according to one embodiment of the present invention.

FIG. 2 is an illustrative diagram depicting a hardware configuration of the robot according to one embodiment of the present invention. Referring to FIG. 2, the robot 10 has a control device 110 included in the main body portion 102.

The control device 110 includes a central processing unit (CPU) 111 performing arithmetic processing, a random access memory (RAM) 112, a read only memory (ROM) 113, an external memory 114, and the like. The control device 110 determines the operation of the robot 10 according to image data generated by a camera 121, audio data generated by a microphone 122, a command signal received by a communication interface 124, or the like. The camera 121, the microphone 122, and the communication interface 124 are connected to the control device 110 via a bus interface 115.

Here, the camera 121 as an example of an image input device includes an imaging element, a lens, and an image processing circuit. The camera 121 generates image data obtained by capturing an image of the periphery of the robot 10. The microphone 122 as an example of a sound input device generates audio data obtained by capturing sound of the periphery of the robot. The communication interface 124 performs communication by wire or radio with an external device, and thereby transmits and receives various kinds of signals and data to and from the external device. Specifically, the communication interface 124 may transmit and receive signals to and from a terminal device functioning as a remote controller of the robot 10, the terminal device being, for example, a smart phone, a tablet, or a dedicated controller, by wireless communication using Bluetooth (registered trademark), a wireless local area network (LAN), infrared rays, or the like. In addition, the communication interface 124 may be connected to a network via the external device, and transmit and receive signals to and from a server on the network.

In addition, the control device 110 controls each part of the robot 10 so as to perform a determined operation. Specifically, the control device 110 controls motors 150 that rotation-drive the joint portions of the arm portions 103L and 103R, the hand portions 104L and 104R, and the leg portions 105L and 105R so as to perform the determined operation. Though not depicted, a joint portion driven by a motor 150 may be provided also to the head portion 101, the main body portion 102, and the foot portions 106L and 106R. At this time, the control device 110 refers to detected values of a distance measuring sensor (not depicted), an inertial measurement unit (IMU) 125, grounding confirming sensors 126L and 126R, a load sensor (not depicted), and a power control device 127 as required. In addition, the control device 110 may provide audio data to a speaker 123 or transmit a command signal from the communication interface 124 to the external device so as to perform the determined operation. The speaker 123, the communication interface 124, the motor 150, the distance measuring sensor, the IMU 125, the grounding confirming sensors 126L and 126R, the load sensor, and the power control device 127 are connected to the control device 110 via the bus interface 115.

Here, the distance measuring sensor detects a distance to an object present on the periphery of the robot 10. The IMU 125 detects the posture and inclination of the main body portion 102. The grounding confirming sensors 126L and 126R detect contact of the foot portions 106L and 106R with a floor surface. The load sensor detects a load applied to each of the foot portions 106L and 106R. The power control device 127 is used to manage a power supply such as a battery or the like, and detects a remaining capacity of the power supply.

For example, the CPU 111 of the control device 110 selects a pattern corresponding to the determined operation from control patterns stored in the ROM 113 or the external memory 114, sets a foot portion movement, a zero moment point (ZMP) trajectory, a trunk movement, an upper limb movement, the horizontal position and height of the waist portion, and the like according to the selected pattern, and controls the motors 150 according to these set values. At this time, the CPU 111 may adaptively control the motors 150 according to the detected values of the sensors as described above or the like.

(Configuration for Driving Joint Portion)

Figure 3:
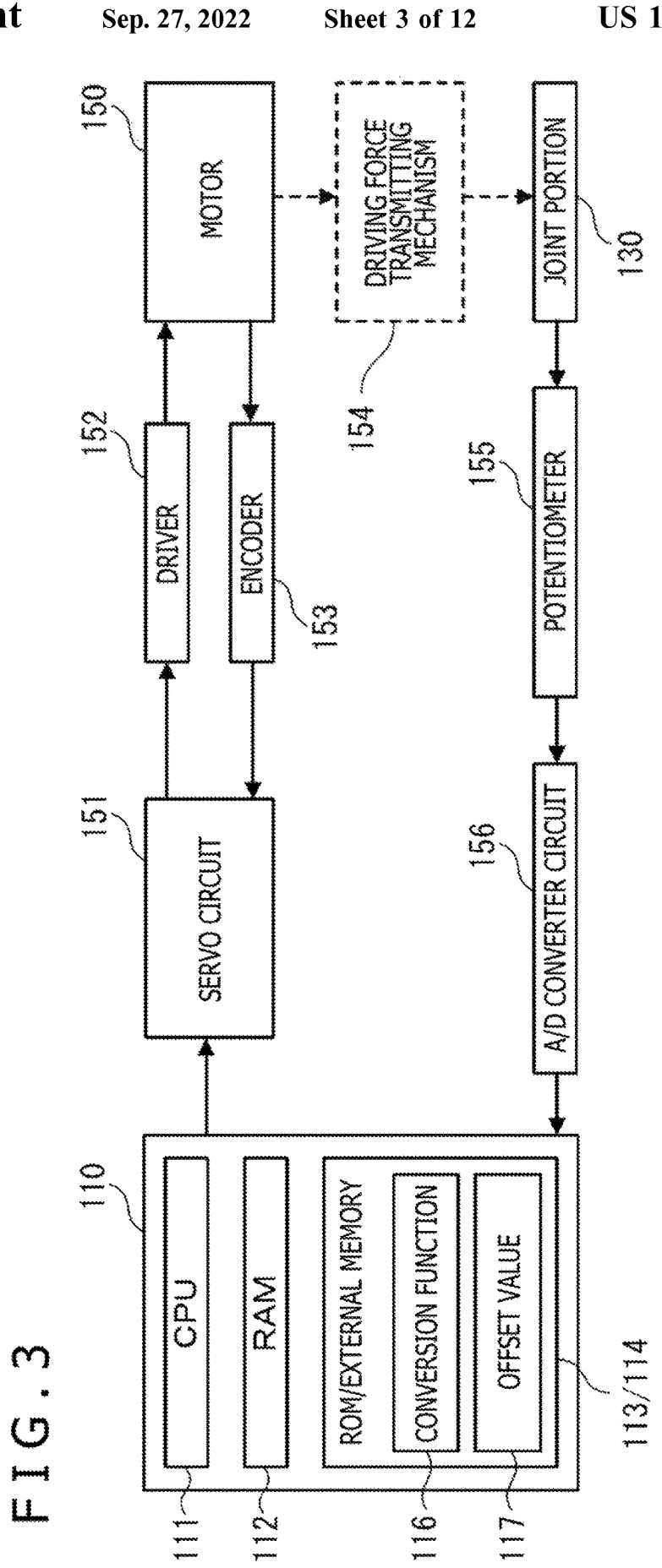
FIG. 3 is an illustrative block diagram depicting a configuration for driving a joint portion of the robot according to one embodiment of the present invention.

FIG. 3 is an illustrative block diagram depicting a configuration for driving a joint portion of the robot according to one embodiment of the present invention. Referring to FIG. 3, the robot 10 includes a servo circuit 151, a driver 152, an encoder 153, a driving force transmitting mechanism 154, a potentiometer 155, and an analog/digital (A/D) converter circuit 156 in addition to the control device 110 and a motor 150 as a configuration for driving a joint portion 130 (joint portions of the robot 10 as depicted in FIG. 1 will hereinafter be collectively referred to also as the joint portion 130). The control device 110 inputs a target value of a rotational angle of the motor 150 to the servo circuit 151. The servo circuit 151 drives the motor 150 by inputting a control signal to the driver 152, and detects the rotational angle of the motor 150 on the basis of a pulse signal output from the encoder 153 as the motor 150 rotates. The servo circuit 151 adjusts the control signal input the driver 152 such that the rotational angle reaches the target value.

The driving force transmitting mechanism 154 transmits a rotational driving force of the motor 150 to the joint portion 130. A relative rotation thereby occurs between two links coupled to the joint portion 130 (for example, the waist link 145 and the thigh link 146L in a case of the crotch joint portion 134L depicted in FIG. 1). The potentiometer 155 is attached to the joint portion 130 so as to detect this relative rotation. Hence, when the above-described relative rotation occurs, an output voltage of the potentiometer 155 changes according to the rotational angle. The control device 110 obtains a digital signal generated by the A/D converter circuit 156 on the basis of the output voltage.

In the control device 110, the CPU 111 calculates the rotational angle detected by the potentiometer 155 on the basis of the signal input from the A/D converter circuit 156. At this time, the CPU 111 refers to a conversion function 116 stored in the ROM 113 or the external memory 114. Further, as required, the CPU 111 refers to an offset value 117 stored in the ROM 113 or the external memory 114 separately from the conversion function 116. Incidentally, details of the conversion function 116 and the offset value 117 will be described later. By comparing the target value of the rotational angle of the motor 150, the target value being input to the servo circuit 151 by the control device 110, with a result of the calculation of the rotational angle detected by the potentiometer 155, it is possible to extract a difference between an ideal value of the rotational angle of the joint portion 130 (for example, a rotational angle considered to be necessary for the robot 10 to perform a predetermined operation) and the actually occurring rotational angle. In a case where the difference is large, for example, the control device 110 inputs an additional target value for compensating for the difference to the servo circuit 151.

Incidentally, in the robot 10 according to the present embodiment, the feedback of the rotational angle by the potentiometer 155 does not necessarily need to be performed at all of the joint portion 130, and the potentiometer 155 and the A/D converter circuit 156 may not be attached to at least a part of the joint portions. In addition, the difference between the ideal value of the rotational angle and the actually occurring rotational angle may be estimated by detecting the posture and inclination of the robot 10 from a detected value of another sensor such as the IMU 125 depicted in FIG. 2 or the like instead of detecting the actual rotational angle by the potentiometer 155.

(Backlash in Joint Structure)

A backlash refers to a gap present in an engaging portion of a machine element such as a gear or the like. In general, a backlash of an appropriate magnitude is intentionally provided to enable smooth movement of the machine element. However, the backlash may increase to exceed an appropriate range due to wear of the member.

Figure 4:
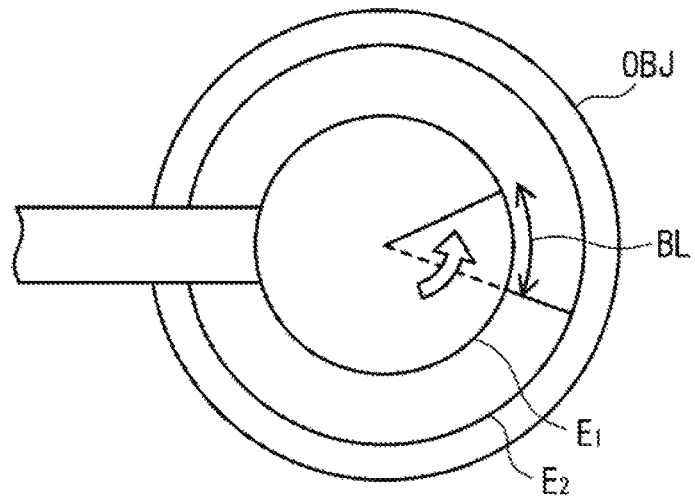
FIG. 4 is a diagram of assistance in explaining an example of a typical backlash.

FIG. 4 is a diagram of assistance in explaining an example of a typical backlash. As depicted in FIG. 4, in a case of rotating an object OBJ symmetric with respect to a rotational axis, the object OBJ being, for example, a wheel, a turn table, or the like, the position of a backlash BL is determined by the direction of rotation driving. Specifically, as depicted in the figure, the backlash BL occurs at a position such that the rotation of a driving side element $E_1$ precedes the rotation of a driven side element $E_2$. When the direction of the rotation driving is reversed, positional relation between the driving side element $E_1$, the driven side element $E_2$, and the backlash BL is reversed, and therefore a rotation-driving dead band corresponding to the magnitude of the backlash BL occurs.

Figure 5A:
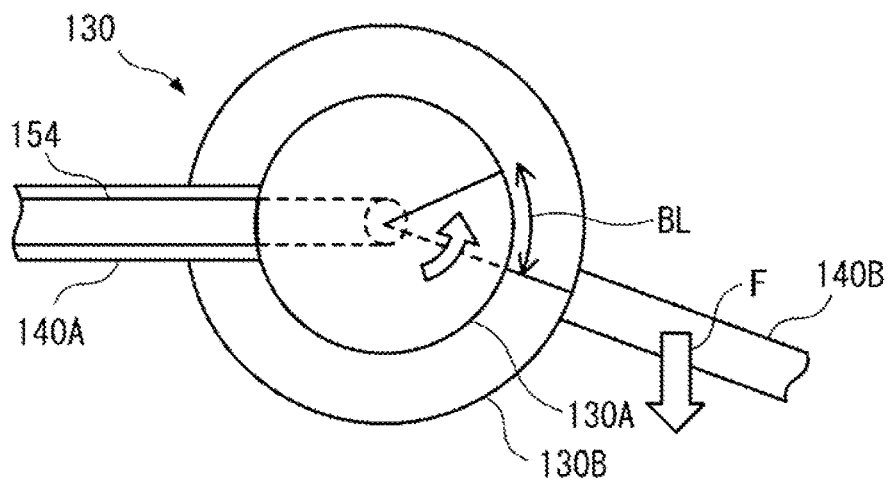
FIG. 5A is a diagram of assistance in explaining an example of a backlash in the joint portion of the robot.
Figure 5B:
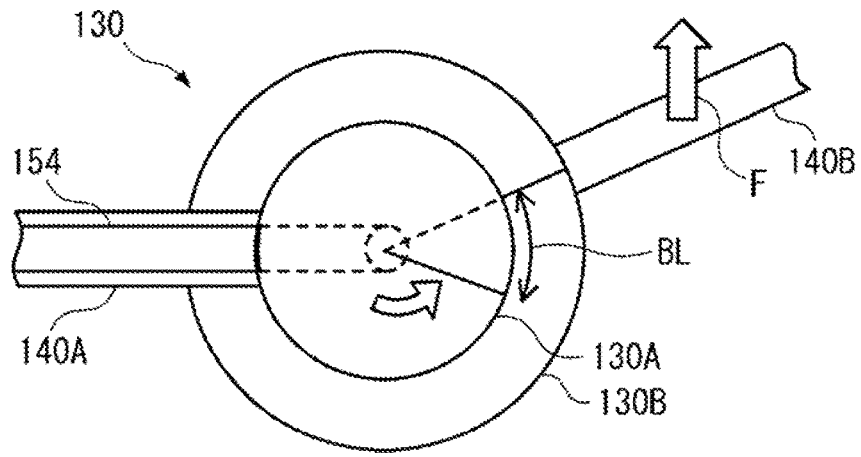
FIG. 5B is a diagram of assistance in explaining the example of the backlash in the joint portion of the robot.

FIG. 5A and FIG. 5B are diagrams of assistance in explaining an example of a backlash in a joint portion of the robot. FIG. 5A and FIG. 5B depict a main body side link 140A of the robot 10 (links coupled to the main body side of the joint portion 130 among the links of the robot 10 as depicted in FIG. 1 will hereinafter be collectively referred to also as the main body side link 140A), the joint portion 130, and a distal side link 140B (links coupled to the distal side of the joint portion 130 among the links of the robot 10 as depicted in FIG. 1 will hereinafter be collectively referred to also as the distal side link 140B). The joint portion 130 includes a first part 130A coupled to the main body side link 140A and a second part 130B coupled to the distal side link 140B. Incidentally, the second part 130B is capable of relative rotation with respect to the first part 130A.

Here, in the example depicted in FIG. 5A and FIG. 5B, a rotational driving force transmitted by the driving force transmitting mechanism 154 effects a relative rotation of the second part 130B with respect to the first part 130A. As a result, the distal side link 140B rotates relative to the main body side link 140A. At this time, the distal side link 140B as a rotation target object is not symmetric with respect to a rotational axis. Hence, the position of the backlash BL is determined by the direction of a force F acting on the distal side link 140B rather than the direction of the rotation driving.

Specifically, in the example of FIG. 5A, a force F that causes a moment in an opposite direction from that of the rotation driving acts on the distal side link 140B, and therefore a backlash BL such that the rotation of the first part 130A precedes the rotation of the second part 130B occurs as in the example of FIG. 4 described above. In the example of FIG. 5B, on the other hand, a force F that causes a moment in the same direction as the rotation driving acts on the distal side link 140B, and therefore a backlash BL such that the rotation of the second part 130B precedes the rotation of the first part 130A occurs unlike the examples of FIG. 4 and FIG. 5A.

(Effect of Backlash in Bipedal Walking)

Figure 6A:
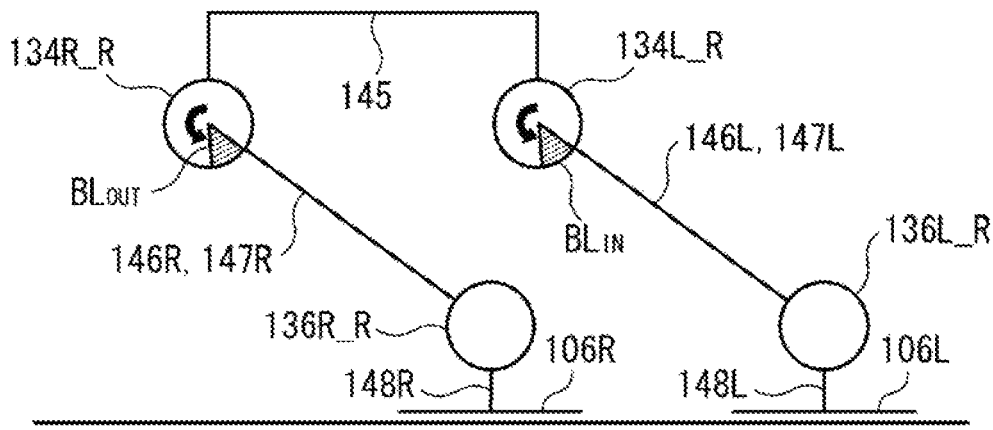
FIG. 6A is a diagram of assistance in explaining an example of an effect of a backlash in the bipedal walking of the robot.
Figure 6B:
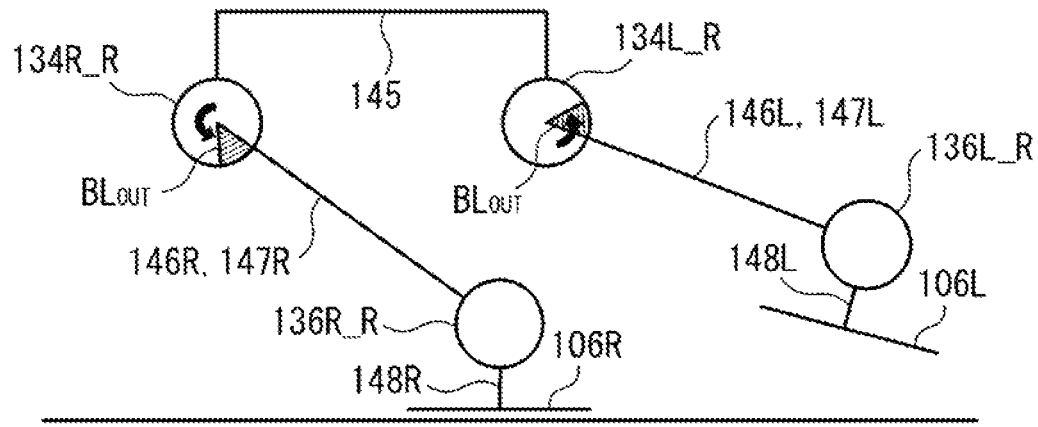
FIG. 6B is a diagram of assistance in explaining the example of the effect of the backlash in the bipedal walking of the robot.
Figure 6C:
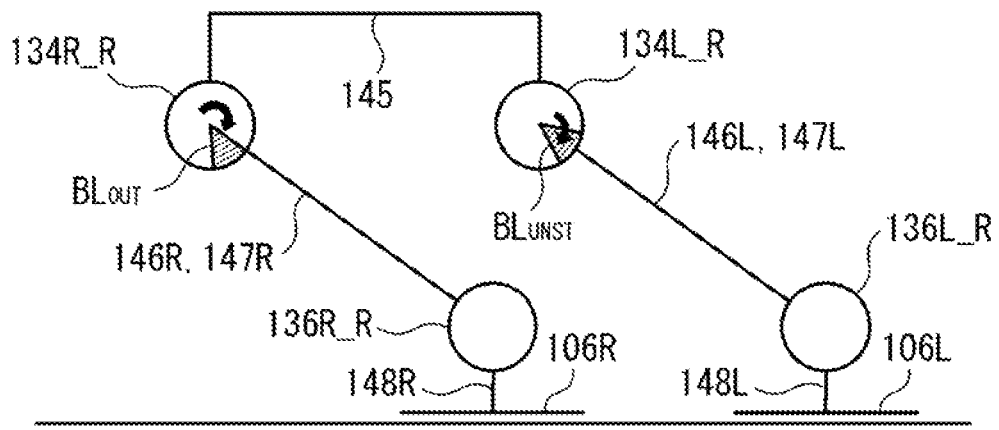
FIG. 6C is a diagram of assistance in explaining the example of the effect of the backlash in the bipedal walking of the robot.

FIGS. 6A to 6C are diagrams of assistance in explaining an example of an effect of a backlash in bipedal walking of the robot. These figures depict changes in backlashes BL occurring in the crotch roll joint portions 134L_R and 134R_R when the robot 10 performs bipedal walking. Incidentally, for simplicity, a pitch joint portion and a yaw joint portion that do not produce roll rotation are not depicted. In addition, backlashes occurring in the ankle roll joint portions 136L_R and 136R_R are not depicted either.

FIG. 6A depicts a state in which the robot 10 moves the center of gravity of the robot 10 to a right side in a stage before raising the left leg portion 105L in bipedal walking. In this state, the own weight of the robot 10 is supported by both of the left and right leg portions 105L and 105R. Hence, an upward reaction force from the floor surface acts on the left and right thigh links 146L and 146R (corresponding to the distal side link 140B in the example of FIG. 5A and FIG. 5B described above). As a result, backlashes as depicted in the figure occur in the roll joint portions 134L_R and 134R_R. Specifically, an inside backlash $BL_{IN}$ occurs in the left roll joint portion 134L_R, and an outside backlash $BL_{OUT}$ occurs in the right roll joint portion 134R_R.

FIG. 6B depicts a state in which the robot 10 has raised the left leg portion 105L after the state depicted in FIG. 6A. In this state, the own weight of the robot 10 is supported by the right leg portion 105R. Hence, the upward reaction force from the floor surface continues to act on the right thigh link 146R, and the outside backlash $BL_{OUT}$ occurs in the right roll joint portion 134R_R. On the other hand, the reaction force from the floor surface no longer acts on the left thigh link 146L. In this state, the link 146L constitutes a (slanted) cantilever having the left roll joint portion 134L_R as a fulcrum. Hence, a downward gravity applied to the link 146L itself and the distal side parts of the leg portion 105L which parts are coupled to the link 146L (that is, the knee joint portion 135L, the crus link 147L, the ankle joint portion 136L, the ankle link 148L, and the foot portion 106L) acts on the link 146L. As a result, the backlash occurring in the left roll joint portion 134L_R changes from the inside backlash $BL_{IN}$ depicted in FIG. 6A to an outside backlash $BL_{OUT}$.

FIG. 6C depicts a state in which the robot 10 has lowered the left leg portion 105L to the floor surface after the state depicted in FIG. 6B. In this state, when the left foot portion 106L comes into contact with the floor surface again, the own weight of the robot 10 is supported by both of the left and right leg portions 105L and 105R. However, at this time point, the backlash occurring in the left roll joint portion 134L_R switches from the outside backlash $BL_{OUT}$ to the inside backlash $BL_{IN}$ again, and therefore a dead band accompanying the switching occurs. During this period, an unstable backlash $BL_{UNST}$ occurs in the left roll joint portion 134L_R (that is, the backlash is present but the position of the backlash is not stable), and there is a possibility of alternate and irregular occurrence of a state in which the reaction force from the floor surface acts on the left thigh link 146L and a state in which the reaction force from the floor surface does not act on the left thigh link 146L. There is consequently a possibility that an unexpected moment is applied to the robot 10 including the leg portions 105L and 105R or a vibration occurs in the robot 10, and that the robot 10 thereby topples over.

(Example of Joint Structure of Robot)

Figure 7:
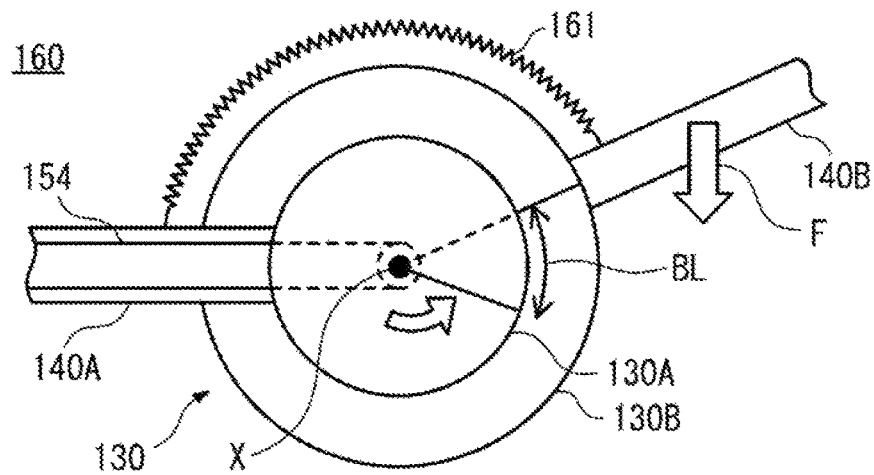
FIG. 7 is a diagram depicting an example of a joint structure of the robot according to one embodiment of the present invention.

FIG. 7 is a diagram depicting an example of a joint structure of the robot according to one embodiment of the present invention. Referring to FIG. 7, a joint structure 160 of the robot 10 includes the joint portion 130 including the first part 130A and the second part 130B, the driving force transmitting mechanism 154, and a tension spring 161. Here, as described above with reference to FIG. 5A and FIG. 5B, the first part 130A of the joint portion 130 is coupled to the main body side link 140A, and the second part 130B of the joint portion 130 is coupled to the distal side link 140B.

Here, the main body side link 140A refers to a link that is one of the links coupled to the joint portion 130 and which is on a side closer to the main body portion 102 of the robot 10. Similarly, the distal side link 140B refers to a link that is one of the links coupled to the joint portion 130 and which is on a side more distant from the main body portion 102. Specifically, in the case of the left leg portion 105L, as for the crotch joint portion 134L, the waist link 145 corresponds to the main body side link 140A, and the thigh link 146L corresponds to the distal side link 140B. As for the knee joint portion 135L, the thigh link 146L corresponds to the main body side link 140A, and the crus link 147L corresponds to the distal side link 140B. As for the ankle joint portion 136L, the crus link 147L corresponds to the main body side link 140A, and the ankle link 148L corresponds to the distal side link 140B.

As is understood from the above-described example, a same link can be the main body side link 140A and can be the distal side link 140B, depending on with which joint portion of the robot 10 the joint portion 130 is associated. While description has been made by taking the joint portions of the left leg portion 105L as an example in the foregoing, the same is true for the joint portions of the right leg portion 105R. In addition, the main body side link 140A and the distal side link 140B can be similarly defined in the arm portions 103L and 103R. Specifically, in the case of the left arm portion 103L, as for the shoulder joint portion 131L, the shoulder link 141L corresponds to the main body side link 140A, and the upper arm link 142L corresponds to the distal side link 140B. As for the elbow joint portion 132L, the upper arm link 142L corresponds to the main body side link 140A, and the forearm link 143L corresponds to the distal side link 140B. As for the wrist joint portion 133L, the forearm link 143L corresponds to the main body side link 140A, and the wrist link 144L corresponds to the distal side link 140B. Similar definitions are also possible in the right side arm portion 103R.

In other words, the distal side link 140B is a link that can constitute a cantilever having the joint portion 130 as a fulcrum. For example, in the state depicted in FIG. 6B in the foregoing, the thigh link 146L as the distal side link with respect to the crotch joint portion 134L including the left roll joint portion 134L_R constitutes a cantilever having the joint portion 134L as a fulcrum. Specifically, while the foot portion 106L is raised and separated from the floor surface, a first end portion of the link 146L is supported by the joint portion 134L, whereas a second end portion on an opposite side of the link 146L receives a load of the crus link 147L, the ankle joint portion 136L, the ankle link 148L, and the foot portion 106L via the knee joint portion 135L.

The crus link 147L similarly constitutes a cantilever having the knee joint portion 135L as a fulcrum. In addition, the ankle link 148L constitutes a cantilever having the ankle joint portion 136L as a fulcrum. As in the foregoing, when the right leg portion 105R is raised in a bipedal walking operation of the robot 10, the thigh link 146R on the right side constitutes a cantilever having the crotch joint portion 134R as a fulcrum, the crus link 147R constitutes a cantilever having the knee joint portion 135R as a fulcrum, and the ankle link 148R constitutes a cantilever having the ankle joint portion 136R as a fulcrum. In addition, in the arm portions 103L and 103R, each link that can be the distal side link 140B as described above constitutes a cantilever having the joint portion 130 as a fulcrum except for cases where the hand portions 104L and 104R are supported by an object other than the robot 10, for example.

As described above, the joint portion 130 includes the first part 130A coupled to the main body side link 140A and the second part 130B coupled to the distal side link 140B. The first part 130A and the second part 130B are assembled so as to be capable of rotating relative to each other about the rotational axis X directly or via another part of the joint portion 130. Relative rotation of the distal side link 140B with respect to the main body side link 140A in the joint portion 130 is thereby made possible. The driving force transmitting mechanism 154 transmits a rotational driving force for effecting relative rotation of the second part 130B with respect to the first part 130A about the rotational axis X from the motor 150 described above with reference to FIG. 3 to the joint portion 130.

Here, while the driving force transmitting mechanism 154 is depicted including a chain or a belt, the driving force transmitting mechanism 154 does not necessarily need to include a chain or a belt. The driving force transmitting mechanism 154 can include various kinds of machine elements such as a gear and the like. Even if the motor 150 is embedded in the joint portion 130, an engaging portion of at least one set of machine elements constituting the driving force transmitting mechanism 154 is present between the motor 150 and the joint portion 130. Due to a backlash provided to the engaging portion, a phenomenon as described above with reference to FIG. 5A and FIG. 5B and FIGS. 6A to 6C, for example, occurs.

The tension spring 161 included in the joint structure 160 in the present embodiment is an example of biasing means for applying, to the second part 130B of the joint portion 130, a rotational biasing force about the rotational axis X, that is, a rotational biasing force coaxial with the relative rotation of the second part 130B with respect to the first part 130A. In the illustrated example, both ends of the tension spring 161 are respectively coupled to the main body side link 140A and the distal side link 140B. The tension spring 161 is attached between the main body side link 140A and the distal side link 140B in a state of being expanded in advance. A tensile biasing force therefore occurs so as to rotate the distal side link 140B and bring the distal side link 140B close to the main body side link 140A. As described above, the main body side link 140A and the distal side link 140B are respectively coupled to the first part 130A and the second part 130B of the joint portion 130. Thus, a rotational biasing force coaxial with the relative rotation of the second part 130B with respect to the first part 130A is provided by the biasing force that the tension spring 161 applies to the main body side link 140A and the distal side link 140B as described above.

Consequently, in the illustrated example, unlike the example described above with reference to FIG. 5A, although a force F that causes a moment in an opposite direction from rotation driving acts on the distal side link 140B, a backlash BL occurs such that the rotation of the second part 130B precedes the rotation of the first part 130A. Here, as in the example described with reference to FIG. 5B, a backlash BL occurs such that the rotation of the second part 130B precedes the rotation of the first part 130A also when a force F that causes a moment in the same direction as the rotation driving acts on the distal side link 140B. That is, in the example depicted in FIG. 7, the position of the backlash BL does not change irrespective of the direction of the force acting on the distal side link 140B.

(Example of Application of Joint Structure in Leg Portions)

Figure 8A:
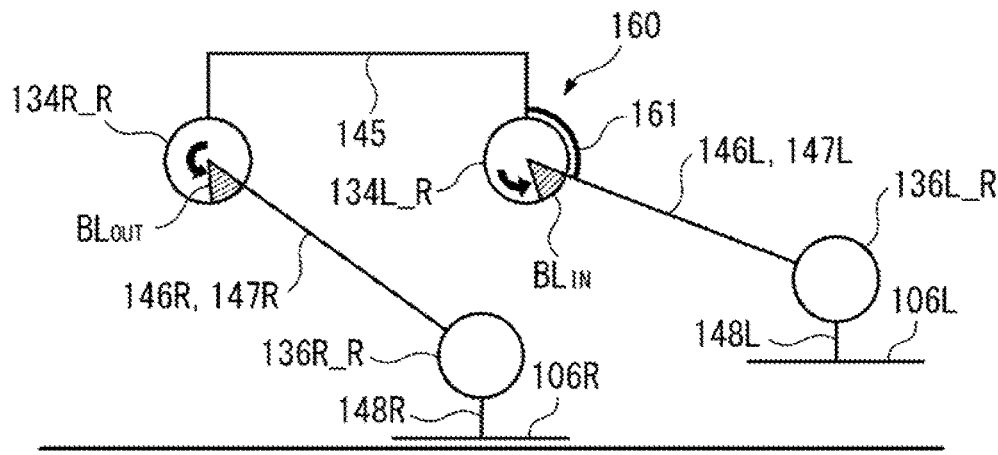
FIG. 8A is a diagram of assistance in explaining an example of application of the joint structure in leg portions of the robot according to one embodiment of the present invention.
Figure 8B:
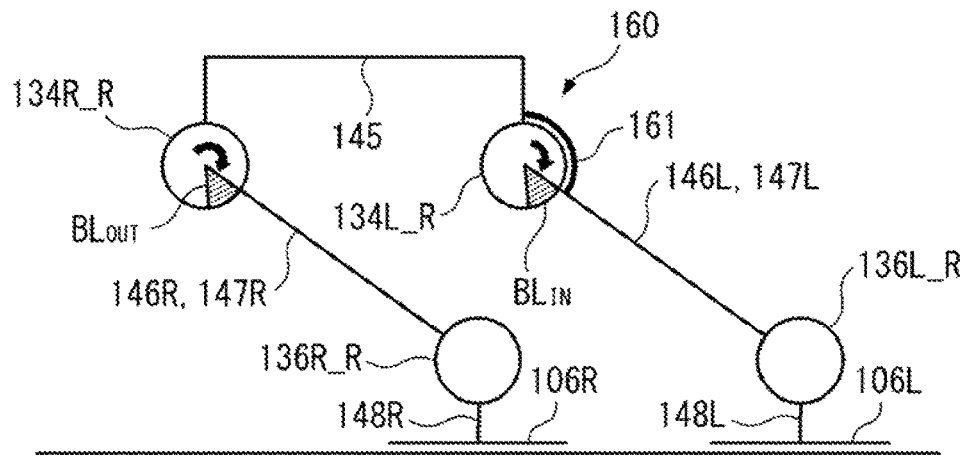
FIG. 8B is a diagram of assistance in explaining the example of application of the joint structure in the leg portions of the robot according to one embodiment of the present invention.

FIG. 8A and FIG. 8B are diagrams of assistance in explaining an example of application of the joint structure 160 described above with reference to FIG. 7 in the leg portions 105L and 105R of the robot 10 according to one embodiment of the present invention. FIG. 8A depicts a state similar to that depicted in FIG. 6B in the foregoing, that is, a state in which the robot 10 has raised the left leg portion 105L from the floor surface in bipedal walking. In the example of FIG. 6B, the backlash occurring in the left roll joint portion 134L_R in this state changes from the inside backlash $BL_{IN}$ to the outside backlash $BL_{OUT}$. In the example of FIG. 8A, the inside backlash $BL_{IN}$ continues to occur in the roll joint portion 134L_R even after the left leg portion 105L is raised. This is because in the joint structure 160 including the roll joint portion 134L_R, the tension spring 161 is attached so as to provide a rotational biasing force that counters the gravity acting on the link 146L when the thigh link 146L constitutes a cantilever having the roll joint portion 134L_R as a fulcrum.

On the other hand, FIG. 8B depicts a state similar to that depicted in FIG. 6C in the foregoing, that is, a state in which the robot 10 has lowered the left leg portion 105L to the floor surface. In the example of FIG. 6C, an unstable backlash $BL_{UNST}$ occurs as the backlash occurring in the left roll joint portion 134L_R in this state changes from the outside backlash $BL_{OUT}$ to the inside backlash $BL_{IN}$ again. On the other hand, in the example of FIG. 8B, the inside backlash $BL_{IN}$ occurs in the roll joint portion 134L_R also while the left leg portion 105L is raised as described above, and therefore the backlash does not change again when the left leg portion 105L is lowered to the floor surface. Hence, occurrence of an unexpected moment and vibration due to the occurrence of the unstable backlash $BL_{UNST}$ is prevented.

Thus, in one embodiment of the present invention, the tension spring 161 in the joint structure 160 as described with reference to FIG. 7 provides a rotational biasing force that counters the gravity acting on the distal side link 140B that constitutes a cantilever having the joint portion 130 as a fulcrum. It is thereby possible to avoid destabilizing the operation of the robot 10 due to the changing of the backlash in the joint portion 130 when the distal side link 140B makes a transition from a state of not constituting a cantilever (state of being supported by a part other than the joint portion 130) to a state of constituting a cantilever (state of being supported by only the joint portion 130).

Incidentally, while description has been made of the joint structure 160 including the left crotch roll joint portion 134L_R in the example of FIG. 8A and FIG. 8B described above, the joint structure 160 including the tension spring 161 can be similarly applied also to the left ankle roll joint portion 136L_R. When a similar joint structure 160 is applied also to the roll joint portion 134R_R (and the roll joint portion 136R_R) included in the right leg portion 105R, an operation at a time of raising the right leg portion 105R in bipedal walking can be stabilized. In addition, while description has been made by taking as an example joint portions enabling roll rotation between links in the leg portions 105L and 105R in FIG. 8A and FIG. 8B, the above-described joint structure 160 can be similarly applied also to joint portions enabling pitch rotation and yaw rotation.

Here, joint portions of the leg portions 105L and 105R of the robot 10 to which joint portions to apply the joint structure 160 may, for example, be determined as follows.

For example, the crotch roll joint portions 134L_R and 134R_R in the above-described example are joint portions in which changing of the backlash may destabilize the operation of the robot 10 because timing in which the supporting of one leg changes to the supporting of two legs (or vice versa) in bipedal walking of the robot 10 coincides with timing in which the backlash changes in the joint portions. In such joint portions, the operation of the robot 10 may be stabilized by applying the joint structure 160. On the other hand, the joint structure 160 may not need to be applied in, for example, joint portions in which the changing of the backlash occurs because the distal side link 140B constitutes a cantilever, but does not lead to the destabilization of the operation because the changing of the backlash occurs while the robot 10 is supported by two legs in bipedal walking, for example, and joint portions in which the changing of the backlash does not occur under assumed control. However, conditions differ in cases where the robot 10 performs operation other than bipedal walking, and conditions differ depending on which joint portions are programmed to operate even in cases where bipedal walking is performed. Thus, the above-described joint structure 160 may be applied to all of the joint portions 130 coupling the main body side link 140A and the distal side link 140B to each other.

(Example of Application of Joint Structure in Arm Portions)

Figure 9A:
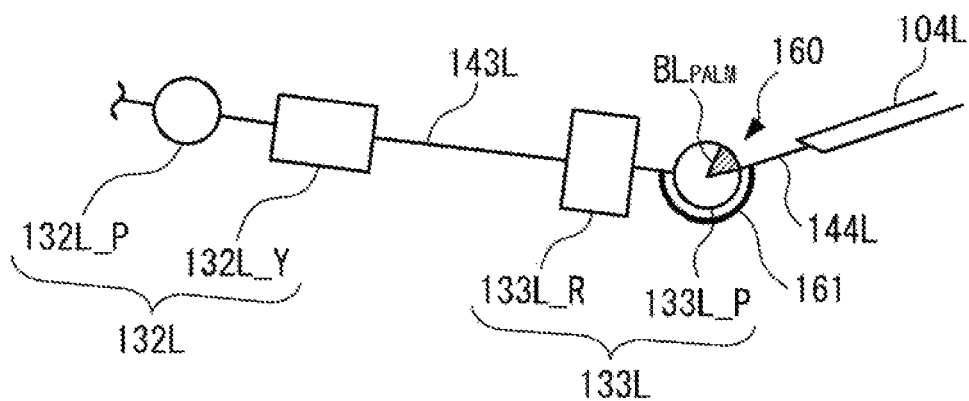
FIG. 9A is a diagram of assistance in explaining an example of application of the joint structure in arm portions of the robot according to one embodiment of the present invention.
Figure 9B:
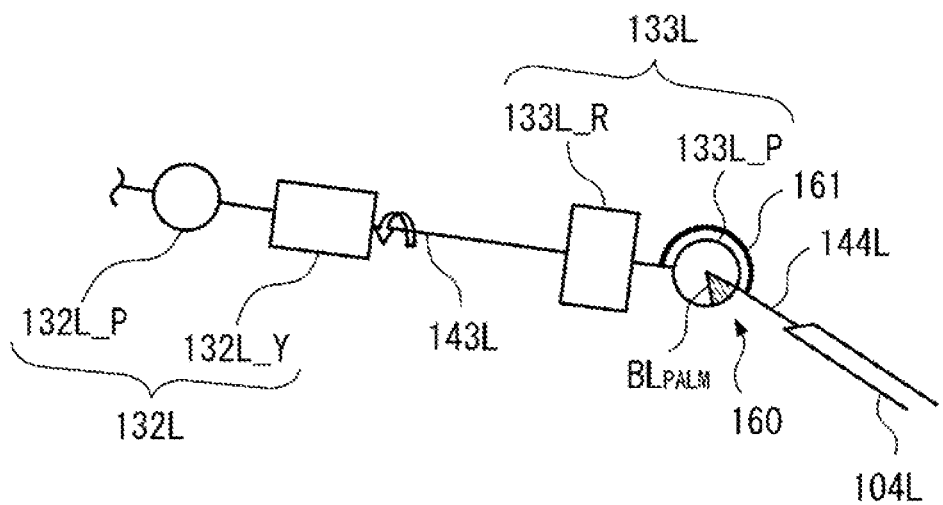
FIG. 9B is a diagram of assistance in explaining the example of application of the joint structure in the arm portions of the robot according to one embodiment of the present invention.

FIG. 9A and FIG. 9B are diagrams of assistance in explaining an example of application of the joint structure 160 described above with reference to FIG. 7 in the left arm portion 103L of the robot 10 according to one embodiment of the present invention. FIG. 9A depicts a state in which the robot 10 has extended the left arm portion 103L horizontally, and the palm of the hand portion 104L is directed upward. In this state, the wrist link 144L constitutes a cantilever supported by the wrist joint portion 133L. However, at this point in time, the tension spring 161 of the joint structure 160 including the pitch joint portion 133L_P of the wrist joint portion 133L provides a rotational biasing force in the same direction as the gravity acting on the link 144L. Hence, in the pitch joint portion 133L_P, a backlash $BL_{PALM}$ on a palm side (upper side in FIG. 9A) occurs according to the gravity acting on the link 144L.

FIG. 9B depicts a state in which the yaw joint portion 132L_Y of the elbow joint portion 132L is rotated by approximately 180 degrees from the state depicted in FIG. 9A. In this state, the wrist link 144L continues to constitute a cantilever supported by the wrist joint portion 133L. However, as a result of the rotation of a part on a terminal side of the yaw joint portion 132L_Y of the arm portion 103L by 180 degrees, the palm of the hand portion 104L is directed downward unlike the state of FIG. 9A. Here, as a result of the rotation of the joint structure 160 including the pitch joint portion 133L_P of the wrist joint portion 133L by 180 degrees, the tension spring 161 provides a rotational biasing force in a direction countering the gravity acting on the link 144L. The backlash occurring in the pitch joint portion 133L_P is consequently maintained to be the backlash $BL_{PALM}$ on the palm side (lower side in FIG. 9B).

In cases where the joint structure 160 is applied to the joint portions of the arm portions 103L and 103R of the robot 10 as in the above-described example, the backlash can be prevented from changing in the joint portion 130 even when the direction of the gravity applied to the distal side link 140B is changed by operation of another joint portion, for example. It is thereby possible to control the positions of the hand portions 104L and 104R, for example, with high accuracy irrespective of operation of the other joint portions, and improve accuracy of an operation of the robot 10 which operation is an operation of holding another object with the hand portions 104L and 104R or moving another object.

In addition, as can be said from the above-described example, the tension spring 161 of the joint structure 160 does not necessarily provide a rotational biasing force that counters the gravity acting on the distal side link 140B at all times while the distal side link 140B constitutes a cantilever having the joint portion 130 as a fulcrum. For example, in a case where the orientation of the distal side link 140B with respect to a gravitational direction changes as in the example described above with reference to FIG. 9A and FIG. 9B, the tension spring 161 may be configured to provide a rotational biasing force that counters the gravity in a specific direction which gravity acts on the distal side link 140B. In this case, the tension spring 161 may provide a rotational biasing force in the same direction as the gravity acting on the distal side link 140B while the gravity acting on the distal side link 140B is not in the specific direction.

(Modifications of Joint Structure)

Figure 10A:
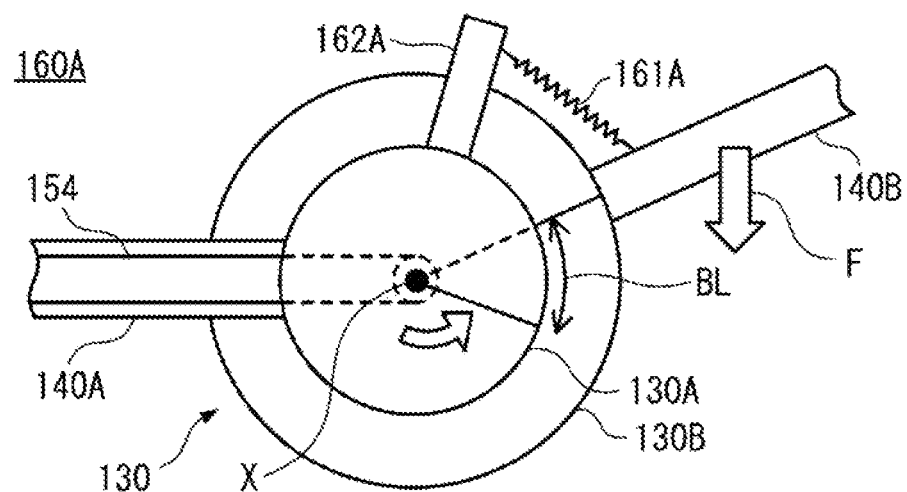
FIG. 10A is a diagram depicting a modification of the joint structure of the robot according to one embodiment of the present invention.
Figure 10B:
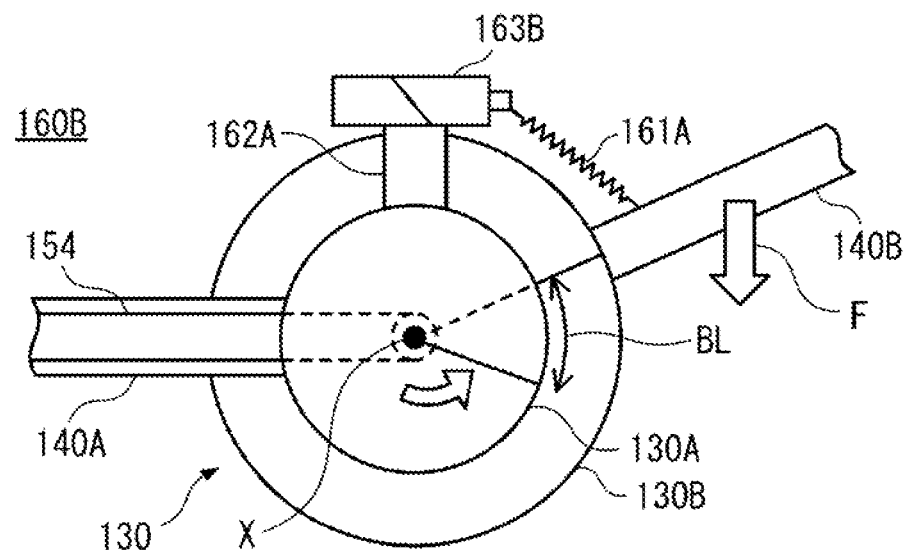
FIG. 10B is a diagram depicting a modification of the joint structure of the robot according to one embodiment of the present invention.

FIG. 10A and FIG. 10B are diagrams depicting modifications of the joint structure of the robot according to one embodiment of the present invention, the joint structure having been described above with reference to FIG. 7. A joint structure 160A according to a modification depicted in FIG. 10A includes a coupling member 162A coupled to the first part 130A of the joint portion 130 and a tension spring 161A. Both ends of the tension spring 161A are respectively coupled to the coupling member 162A and the distal side link 140B. The tension spring 161A is attached between the coupling member 162A and the distal side link 140B in a state of being expanded in advance. A tensile biasing force therefore occurs so as to rotate the distal side link 140B and bring the distal side link 140B close to the coupling member 162A. As described above, the coupling member 162A and the distal side link 140B are respectively coupled to the first part 130A and the second part 130B of the joint portion 130. Thus, a rotational biasing force coaxial with the relative rotation of the second part 130B with respect to the first part 130A is provided by the biasing force that the tension spring 161A applies to the coupling member 162A and the distal side link 140B as described above.

Here, in the modification depicted in FIG. 10A, unlike the example depicted in FIG. 7, one end of the tension spring 161A is coupled to the coupling member 162A coupled to the first part 130A rather than to the main body side link 140A. Thus, as long as a rotational biasing force is ultimately applied to the second part 130B, both ends of the tension spring 161A may be coupled to the main body side link 140A and the distal side link 140B, may be coupled to the coupling member coupled to the first part 130A or the second part 130B, or may be coupled directly to the first part 130A or the second part 130B.

In addition, while the tension spring 161 extends along an arc centered on the rotational axis X (by using a spring guide not depicted, for example) in the modification depicted in FIG. 7, the tension spring 161A extends linearly in the modification depicted in FIG. 10A. Thus, the tension spring 161A may not be arranged such that the tension spring 161A itself produces a rotational biasing force about the rotational axis X. Specifically, for example, utilizing a fact that the first part 130A and the second part 130B of the joint portion 130 are assembled so as to be rotatable relative to each other about the rotational axis X, the tension spring 161A may provide a linear biasing force to the second part 130B or a part coupled to the second part 130B such that a rotational biasing force about the rotational axis X is ultimately applied to the second part 130B.

On the other hand, in a joint structure 160B according to a modification depicted in FIG. 10B, as compared with the modification depicted in FIG. 10A, a solenoid actuator 163B is attached to the coupling member 162A, and the tension spring 161A is coupled to the solenoid actuator 163B. The solenoid actuator 163B operates in a predetermined stroke in a tangential direction of a circle centered on the rotational axis X, and thereby expands or contracts the tension spring 161A as an elastic body constituting biasing means. The length of the tension spring 161A and the position of the coupling member 162A are set such that a linear biasing force that can counter the force F acting on the distal side link 140B is applied when the solenoid actuator 163B expands the tension spring 161A, and such that the linear biasing force that can counter the force F acting on the distal side link 140B is not applied when the solenoid actuator 163B contracts the tension spring 161A.

That is, in the example of FIG. 10B, the solenoid actuator 163B functions as switching means for switching between a first state in which the tension spring 161A applies a sufficient rotational biasing force to the second part 130B of the joint portion 130 and a second state in which the tension spring 161A does not apply the sufficient rotational biasing force to the second part 130B. In the above-described first state, the position of the backlash BL in the joint portion 130 is determined by the biasing force of the tension spring 161A irrespective of the direction of the force F acting on the distal side link 140B. On the other hand, in the above-described second state, the position of the backlash BL in the joint portion 130 is determined by the direction of the force F acting on the distal side link 140B.

Incidentally, the switching means included in the joint structure 160B is not limited to a solenoid actuator, but may be another kind of linear actuator that can expand or contract the tension spring 161A. Alternatively, the switching means may be a rotary actuator that can expand or contract the tension spring 161A by winding up a wire or a belt coupled to the tension spring 161A. As will be described later, other biasing means can be used in place of the tension spring 161A. Also in that case, when the biasing means is an elastic body, a mechanism of expanding or contracting the elastic body, such as the above-described solenoid actuator 163B or the like, can be used as the switching means.

With the use of the joint structure 160B as described above, in an example of bipedal walking as described above with reference to FIG. 8A and FIG. 8B, for example, a rotational biasing force may be applied to the roll joint portions 134L_R and 134R_R while the robot 10 is supported by one leg (that is, while any one of the leg portions 105L and 105R is raised), whereas the rotational biasing force may not be applied while the robot 10 is supported by both legs. While the robot 10 is supported by both legs, there is a relatively small possibility that the operation of the robot 10 becomes unstable even when the changing of the backlash in the joint portion occurs. Thus, with the use of the switching means, the operation of the robot 10 may be stabilized by the rotational biasing force by selecting the above-described first state in a critical situation in the operation of the robot 10, whereas the rotational biasing force may be prevented from producing an unexpected effect on the operation of the robot 10 in other situations by selecting the second state.

Incidentally, in the joint structure of the robot 10 described above, the tension spring 161 (or the tension spring 161A) is an example of the biasing means for applying the rotational biasing force to the second part 130B of the joint portion 130. Specifically, the tension spring 161 (or the tension spring 161A) can be an elastic body such as various kinds of springs including a coil spring, a spiral spring, and the like or a rubber band or the like. In the above-described example, the rotational biasing force is applied to the second part 130B by a tensile biasing force produced by the tension spring 161. However, when the position of the tension spring 161 with respect to the distal side link 140B is reversed, for example, the rotational biasing force can be applied to the second part 130B by a compressive biasing force produced by the tension spring 161.

(Calibration of Potentiometer)

The potentiometer 155 described above with reference to FIG. 3 is a sensor that detects relative rotation occurring between the two links coupled to the joint portion 130. The output voltage of the potentiometer 155 changes according to the rotational angle of a part of the joint portion 130 to which the potentiometer 155 is attached (which part is, for example, the second part 130B described above with reference to FIG. 5A and FIG. 5B and the like). The control device 110 of the robot 10 recognizes an actual rotational angle in the joint portion 130 by a digital signal based on the output voltage.

Figure 11:
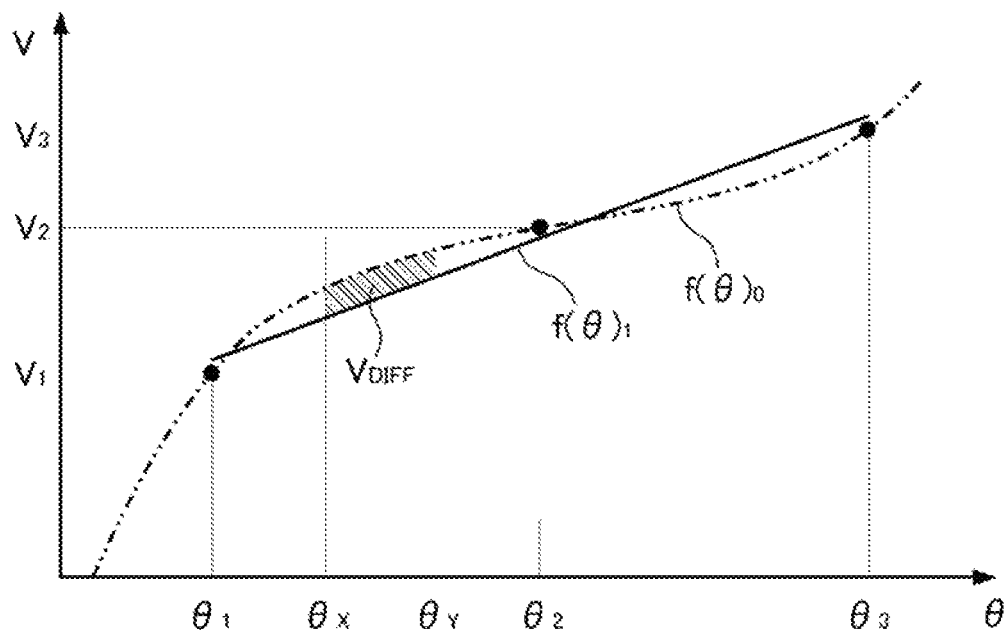
FIG. 11 is a graph of assistance in explaining an example of calibration of a potentiometer.

FIG. 11 is a graph of assistance in explaining an example of calibration of the potentiometer. In the graph of FIG. 11, an axis of abscissas indicates the rotational angle $\theta$ of the joint portion 130 to which the potentiometer 155 is attached, and an axis of ordinates indicates the output voltage V of the potentiometer 155. In the illustrated example, the output voltage V changes according to a function $f(\theta)_0$ with respect to the rotational angle $\theta$. The function $f(\theta)_0$ varies according to an individual difference of the potentiometer 155 or the like. Thus, calibration of the potentiometer 155 is needed to convert the output voltage V to the rotational angle $\theta$.

In the illustrated example, for three rotational angles $\theta_1$, $\theta_2$, and $\theta_3$, output voltages $V_1$, $V_2$, and $V_3$ at the rotational angles are measured, and a function $f(\theta)_1$ approximate to relation between the rotational angle $\theta$ and the output voltage V is obtained from a result of the measurement. The function $f(\theta)_1$ in the illustrated example is an approximate straight line determined with the point $(\theta_1, V_1)$, the point $(\theta_2, V_2)$, and the point $(\theta_3, V_3)$ as a reference. The definition of such a function $f(\theta)_1$ enables conversion of the output voltage V to the estimated value of the rotational angle $\theta$ by setting $\theta=f^{-1}(V)_1$ even when the output voltage V of the potentiometer 155 is an arbitrary value other than the output voltages $V_1$, $V_2$, and $V_3$. Incidentally, in the following description, this function $f^{-1}(V)_1$ will be referred to also as a conversion function obtained by calibration of the potentiometer 155.

However, as depicted in the figure, the function $f(\theta)_0$ indicating the original output voltage V of the potentiometer 155 with respect to the rotational angle $\theta$ is not necessarily a linear function. Hence, there is a possibility of occurrence of a larger difference $V_{DIFF}$ between the original function $f(\theta)_0$ and the function $f(\theta)_1$ at rotational angles (illustrated as a range between a rotational angle $\theta_x$ and a rotational angle $\theta_y$ in FIG. 11) different from the three rotational angles $\theta_1$, $\theta_2$, and $\theta_3$ serving as references for determining the function $f(\theta)_1$, for example. In the range of such rotational angles $\theta$, there is a possibility that a difference is present between the estimated value of the rotational angle $\theta$ on the basis of the conversion function $f^{-1}(V)_1$ and the actual rotational angle $\theta$, that is, there is a possibility that the estimated value of the rotational angle $\theta$ on the basis of the output voltage V of the potentiometer 155 is not necessarily accurate.

Here, as described with reference to FIGS. 6A to 6C described above or the like, in the operation of the robot 10, there is a situation in which an unexpected moment or vibration (even if the moment or the vibration is small) leads to a result such as toppling over of the robot 10 or the like, such as a situation of switching between support by both legs and support by one leg in bipedal walking, for example. In the following description, such a situation will be referred to also as a critical situation in the operation of the robot 10. In a case where the difference $V_{DIFF}$ as depicted in FIG. 11 occurs at a rotational angle in a critical situation in the operation of the robot 10, for example, there is a possibility that a result such as toppling over or the like occurs easily because the estimated value of the rotational angle $\theta$ used for the control device 110 to control the robot 10 is not accurate.

As described above with reference to FIG. 3, the control device 110 extracts a difference between the ideal value of the rotational angle of the joint portion 130 and the actually occurring rotational angle $\theta$ by comparing the target value of the rotational angle of the motor 150 which target value is input to the servo circuit 151 and the rotational angle $\theta$ detected by the potentiometer 155. When this difference is large, the control device 110 inputs an additional target value for compensating for the difference to the servo circuit 151. Such control can appropriately control the operation of the robot 10 by reducing the effect of the backlash occurring in the driving force transmitting mechanism 154 that transmits a rotational driving force from the motor 150 to the joint portion 130, for example. However, as already described, the rotational angle $\theta$ used by the control device 110 to control the robot 10 is the estimated value converted from the output voltage V by using the conversion function $f^{-1}(V)_1$. Hence, when the estimated value of the rotational angle $\theta$ is not accurate due to the difference $V_{DIFF}$ depicted in FIG. 11, for example, there is a possibility that the operation of the robot 10 is not controlled appropriately because an additional target value that is supposed be necessary is not input or an additional target value that is supposed to be unnecessary is input.

Meanwhile, the control device 110 can also recognize states such as the posture and inclination of the robot 10, contact of the foot portions 106L and 106R with the floor surface, and the like via sensors such as the IMU 125 and the grounding confirming sensors 126L and 126R described above with reference to FIG. 2 or the like. The detected values of these sensors, for example, may be used to control the operation of the robot 10 appropriately in a critical situation as described above. For example, during support by one leg in bipedal walking, the operation of the robot 10 can be controlled appropriately without being affected by the difference $V_{DIFF}$ depicted in FIG. 11 by controlling the rotational angle $\theta$ of the joint portion 130 while constantly checking the posture of the robot 10 by referring to the detected value of the IMU 125. However, control of feeding back the posture of the robot 10 which posture is detected by the IMU 125 as described above imposes a heavy processing load on the CPU 111. Unlike a relatively simple control of compensating for a difference in the rotational angle, the processing load is increased greatly by incorporating a physical quantity indicating the posture of the robot 10 (which physical quantity is specifically acceleration and angular velocity) into parameters for control.

(Application of Offset Value to Calibration Result)

Figure 12:
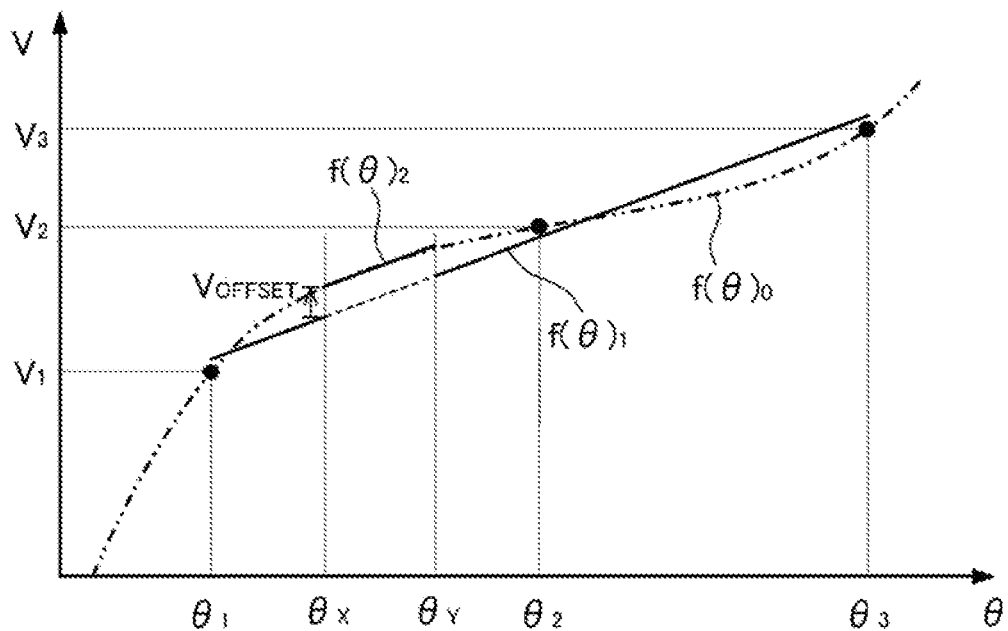
FIG. 12 is a graph of assistance in explaining application of an offset value to a potentiometer calibration result in one embodiment of the present invention.

FIG. 12 is a graph of assistance in explaining application of an offset value to a potentiometer calibration result in one embodiment of the present invention. In an example depicted in the graph of FIG. 12, a function $f(\theta)_2$ obtained by adding an offset value $V_{OFFSET}$ to the value of the function $f(\theta)_1$ is used to convert the output voltage V of the potentiometer 155 to the rotational angle θ in the range between the rotational angle $\theta_x$ and the rotational angle $\theta_y$. In the illustrated example, the offset value $V_{OFFSET}$ compensates for a difference between the function $f(\theta)_0$ and the function $f(\theta)_2$ in the range between the rotational angle $\theta_x$ and the rotational angle $\theta_y$.

When the range between the rotational angle $\theta_x$ and the rotational angle $\theta_y$ is a range of rotational angles θ in a critical situation in the operation of the robot 10, for example, the application of the offset value $V_{OFFSET}$ compensates for the difference between the estimated value of the rotational angle θ in the case of using the conversion function $f^{-1}(V)_1$ in this range and the actual rotational angle θ. As a result, the control device 110 can recognize an accurate rotational angle θ in this range, and control the operation of the robot 10 more appropriately. On the other hand, in the example of FIG. 12, the offset value $V_{OFFSET}$ is applied in a limited manner in the range between the rotational angle $\theta_x$ and the rotational angle $\theta_y$. That is, the original function $f(\theta)_1$ and the conversion function $f^{-1}(V)_1$ are used at rotational angles θ other than the range between the rotational angle $\theta_x$ and the rotational angle $\theta_y$. However, the rotational angle $\theta_x$ and the rotational angle $\theta_y$ may not necessarily be detected directly. For example, as in an example of a setting procedure to be described later, when a critical situation in operation is identified by using another sensor possessed by the robot 10, such as the IMU 125 or the like, and the offset value $V_{OFFSET}$ is applied in a limited manner in the situation, the offset value $V_{OFFSET}$ is ultimately applied in a limited manner in the range between the rotational angle $\theta_x$ and the rotational angle $\theta_y$. In this case, the application of the offset value $V_{OFFSET}$ in a limited manner in the specific range of rotational angles θ is equivalent to the application of the offset value $V_{OFFSET}$ in a limited manner in a critical situation in the operation of the robot 10.

It is to be noted that in one embodiment of the present invention which embodiment will be described in the following, recognition of an accurate rotational angle θ on the basis of the output voltage V of the potentiometer 155 is made possible by applying the offset value $V_{OFFSET}$ to the conversion function $f^{-1}(V)_1$ and thus setting a function $f^{-1}(V+V_{OFFSET})_1$ equivalent to a conversion function $f^{-1}(V)_2$, rather than replacing the conversion function $f^{-1}(V)_1$ with the conversion function $f^{-1}(V)_2$. Such a configuration is, for example, advantageous for applying the offset value $V_{OFFSET}$ in a limited manner in a critical situation in the operation of the robot 10 as described above, applying different offset values $V_{OFFSET}$ for respective critical situations in a plurality of operations of the robot 10, or updating the offset value $V_{OFFSET}$ so as to correspond to a change in the function $f(\theta)_0$ due to a secular change in the potentiometer 155 or a surrounding environment.

Figure 13:
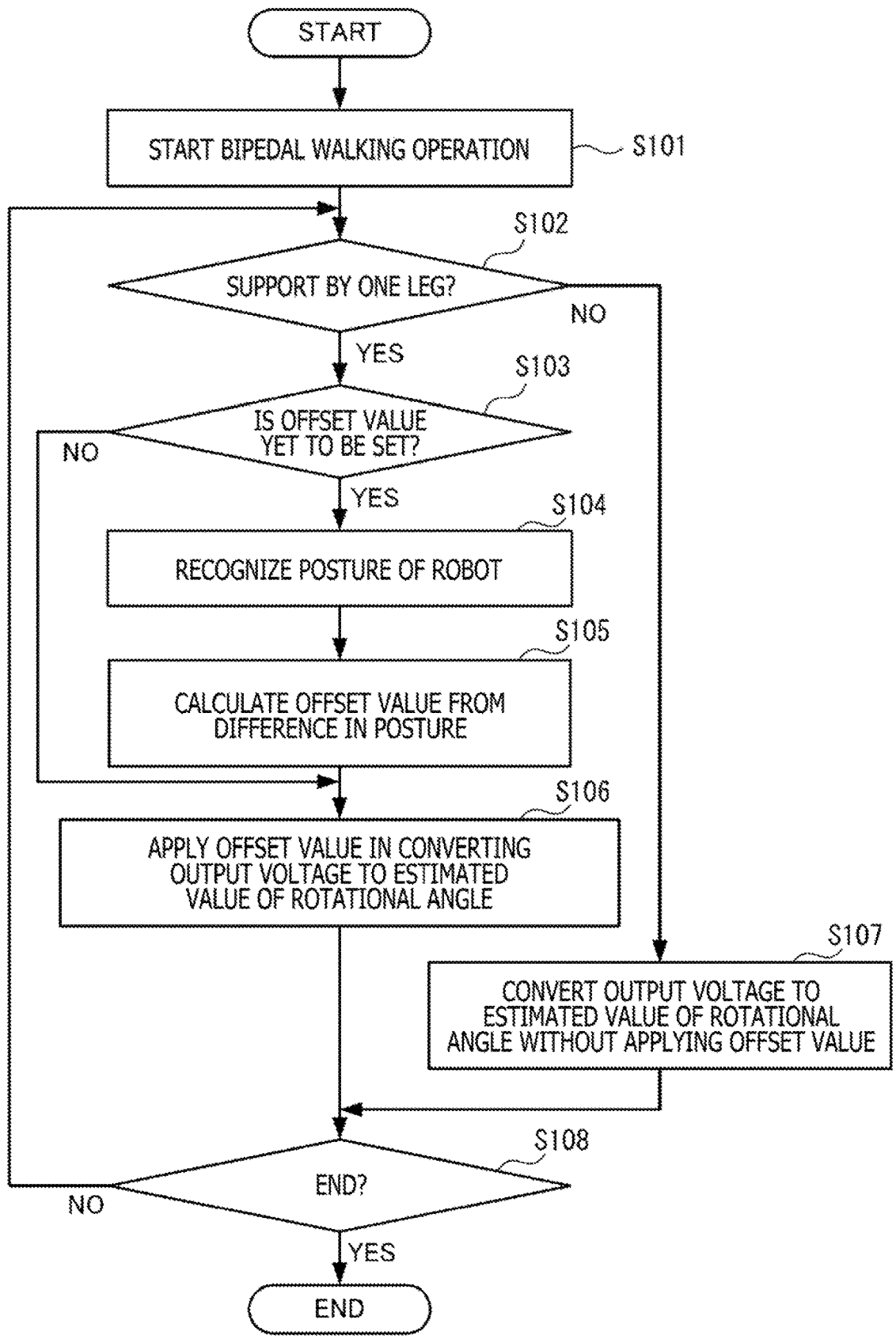
FIG. 13 is a flowchart depicting an example of a concrete procedure for setting and applying the offset value in one embodiment of the present invention.

FIG. 13 is a flowchart depicting an example of a concrete procedure for setting and applying the offset value in one embodiment of the present invention. Incidentally, suppose that in the illustrated processing, the conversion function $f^{-1}(V)_1$ is determined in advance by separate calibration processing.

First, the CPU 111 starts a bipedal walking operation of the robot 10 (step S101). Here, the CPU 111 controls the motor 150 that rotation-drives the joint portion 130 of each part of the robot 10 according to a bipedal walking control pattern read from the ROM 113 or the external memory 114. At this point in time, the CPU 111 converts the output voltage V of the potentiometer 155 to the estimated value of the rotational angle θ according to the conversion function $f^{-1}(V)_1$.

Here, when the grounding confirming sensors 126L and 126R detect that any one of the foot portions 106L and 106R of the robot 10 is not in contact with the floor surface, that is, that the robot 10 is supported by one leg (step S102), and the offset value $V_{OFFSET}$ for bipedal walking is yet to be set (step S103), the CPU 111 performs a procedure for setting the offset value $V_{OFFSET}$. Specifically, the CPU 111 recognizes the posture of the robot 10 by referring to a detection result of the IMU 125 (step S104), and determines the offset value $V_{OFFSET}$ on the basis of a difference between an actual posture and an ideal posture of the robot 10 (for example, an angle of inclination of the actual posture with respect to the ideal posture) (step S105). Here, the ideal posture of the robot 10 in bipedal walking can be a posture such that the main body portion 102 is horizontal, for example.

At the point in time of step S104 described above, the CPU 111 controls the bipedal walking operation of the robot 10 according to the estimated value of the rotational angle θ converted from the output voltage V by using the conversion function $f^{-1}(V)_1$ without applying the offset value $V_{OFFSET}$. Here, when there is a difference between the actual rotational angle θ and the above-described estimated value, a difference corresponding to the difference in the rotational angle θ occurs also in a result of the control, that is, between the actual posture and the ideal posture of the robot 10. Accordingly, in step S105, the CPU 111 determines the offset value $V_{OFFSET}$ on the basis of the difference between the actual posture and the ideal posture of the robot 10. It is made possible to compensate for the difference between the actually occurring rotational angle θ and the recognition result in the above-described case, and maintain an appropriate posture of the robot 10 by the control of the CPU 111 as described above. Specifically, for example, the CPU 111 calculates the offset value $V_{OFFSET}$ for the rotational angle θ of each joint portion by converting the inclination of the actual posture with respect to the appropriate posture into rotations (a pitch rotation, a roll rotation, and a yaw rotation) in the joint portions of the leg portions 105L and 105R.

When the offset value $V_{OFFSET}$ is calculated in step S105 described above, and when the offset value $V_{OFFSET}$ is already set in step S103 described above, the CPU 111 applies the offset value $V_{OFFSET}$ in converting the output voltage V to the estimated value of the rotational angle θ (step S106). Specifically, the CPU 111 sets the function $f^{-1}(V+V_{OFFSET})_1$ by applying the offset value $V_{OFFSET}$ to the conversion function $f^{-1}(V)_1$, and then converts the output voltage V to the estimated value of the rotational angle θ. Consequently, the estimated value of the rotational angle θ approaches the actual rotational angle θ, and the CPU 111 can control the bipedal walking operation of the robot 10 more appropriately.

When the grounding confirming sensors 126L and 126R detect in step S102 described above that the robot 10 is not supported by one leg, that is, the robot 10 is supported by both legs, on the other hand, the CPU 111 converts the output voltage V to the rotational angle θ according to the conversion function $f^{-1}(V)_1$ without applying the offset value $V_{OFFSET}$ (step S107). The above processing is thereafter repeated until the CPU 111 ends the bipedal walking operation of the robot 10 (step S108).

The processing according to the present embodiment as described above can obtain the estimated value of the rotational angle θ in which the effect of the difference $V_{DIFF}$ depicted in FIG. 11 is reduced or removed by applying the offset value $V_{OFFSET}$. In addition, though the detection result of the IMU 125 is referred to when the offset value $V_{OFFSET}$ is set first, a relative simple control of compensating for the difference between the estimated value of the rotational angle θ on the basis of the output voltage V of the potentiometer 155 and the ideal value of the rotational angle θ is thereafter performed. Thus, a processing load on the CPU 111 is greatly reduced.

In addition, while the above description has been made of an example in which the procedure for setting the offset value $V_{OFFSET}$ is performed at the time of a first bipedal walking operation, the CPU 111 may update the offset value $V_{OFFSET}$ at predetermined intervals by periodically performing the procedure for setting the offset value $V_{OFFSET}$. Thus, even when the function $f(θ)_0$ changes according to a secular change in the potentiometer 155 or the surrounding environment, for example, the offset value $V_{OFFSET}$ corresponding to such a change can be set. The procedure for setting the offset value $V_{OFFSET}$ is easy as compared with a procedure of performing calibration of the potentiometer 155 again and defining the function $f(θ)_1$ again, for example, and the procedure for setting the offset value $V_{OFFSET}$ can be performed during normal operation of the robot 10. Hence, in a case where an end user uses the robot 10 at hand over a long period, for example, accurate operation of the robot 10 can be maintained without an increase in the labor of maintenance.

(Selective Application of Plurality of Offset Values)

Figure 14:
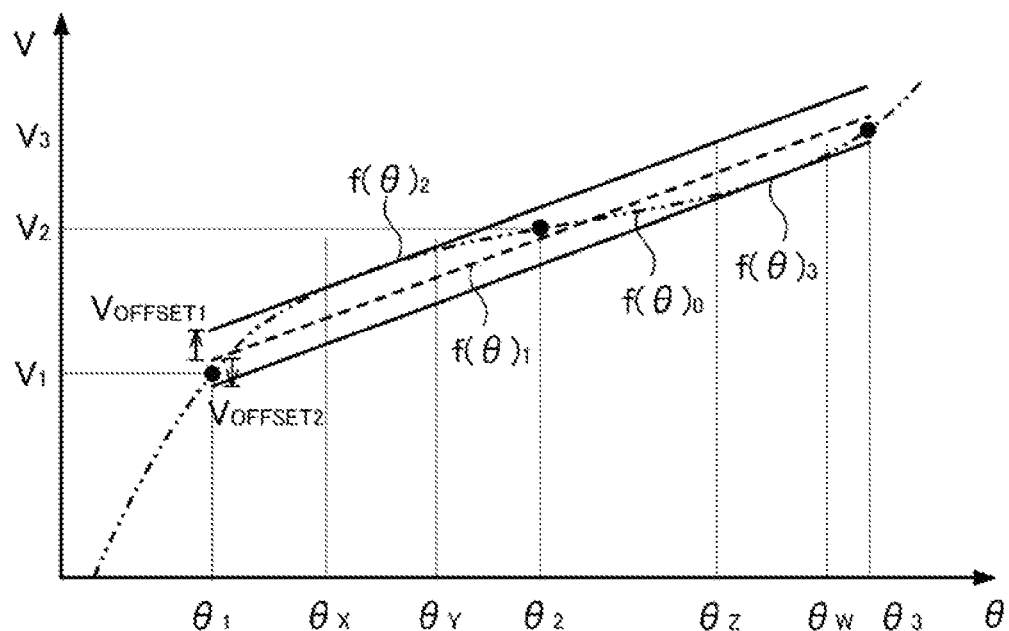
FIG. 14 is a graph of assistance in explaining an example of selectively applying a plurality of offset values to a potentiometer calibration result in one embodiment of the present invention.

FIG. 14 is a graph of assistance in explaining an example of selectively applying a plurality of offset values to a potentiometer calibration result in one embodiment of the present invention. The graph of FIG. 14 depicts a function $f(θ)_3$ obtained by adding a second offset value $V_{OFFSET2}$ to the value of the function $f(θ)_1$ in addition to a function $f(θ)_2$ obtained by adding a first offset value $V_{OFFSET1}$ to the value of the function $f(θ)_1$. Here, as with the offset value $V_{OFFSET}$ depicted in FIG. 12 described above, the first offset value $V_{OFFSET1}$ compensates for a difference between the function $f(θ)_0$ and the function $f(θ)_2$ in the range between the rotational angle $θ_x$ and the rotational angle $θ_y$. On the other hand, the second offset value $V_{OFFSET2}$ compensates for a difference between the function $f(θ)_0$ and the function $f(θ)_3$ in a range between a rotational angle $θ_z$ and a rotational angle $θ_w$ different from the foregoing.

When the range between the rotational angle $θ_z$ and the rotational angle $θ_w$ is a range of rotational angles θ in a critical situation in the operation of the robot 10, the range being different from the range between the rotational angle $θ_x$ and the rotational angle $θ_y$, for example, the application of the second offset value $V_{OFFSET2}$ compensates for a difference between the estimated value of the rotational angle θ in a case where the conversion function $f^{-1}(V)_1$ is used in this range and the actual rotational angle θ. As a result, the control device 110 can recognize an accurate rotational angle θ in this range, and control the operation of the robot 10 more appropriately.

Specifically, for example, the range between the rotational angle $θ_x$ and the rotational angle $θ_y$ can be a range of rotational angles θ in a critical situation in a first operation of the robot 10, for example a situation of support by one leg in bipedal walking, and the range between the rotational angle $θ_z$ and the rotational angle $θ_w$ can be a range of rotational angles θ in a critical situation in a second operation of the robot 10, for example, a situation in which the robot 10 rises from a seated or toppled-over state. As described above, in the present embodiment, the CPU 111 selects a pattern corresponding to a determined operation from control patterns stored in the ROM 113 or the external memory 114, and controls the robot 10 according to the selected pattern. Thus, in the above-described example, bipedal walking as the first operation and rising as the second operation can be identified on the basis of the control pattern being selected.

Here, in applying the first offset value $V_{OFFSET1}$ or the second offset value $V_{OFFSET2}$, the CPU 111 may apply the offset value in a limited manner in a specific range of rotational angles θ (specifically, the range between the rotational angle $θ_x$ and the rotational angle $θ_y$ in the case of the first offset value $V_{OFFSET1}$ and the range between the rotational angle $θ_z$ and the rotational angle $θ_w$ in the case of the second offset value $V_{OFFSET2}$), or may apply the first offset value $V_{OFFSET1}$ or the second offset value $V_{OFFSET2}$ in the entire range of rotational angles θ in a case where a specific control pattern (the bipedal walking pattern and the rising pattern in the above-described concrete example) is selected, as depicted in FIG. 14.

Figure 15:
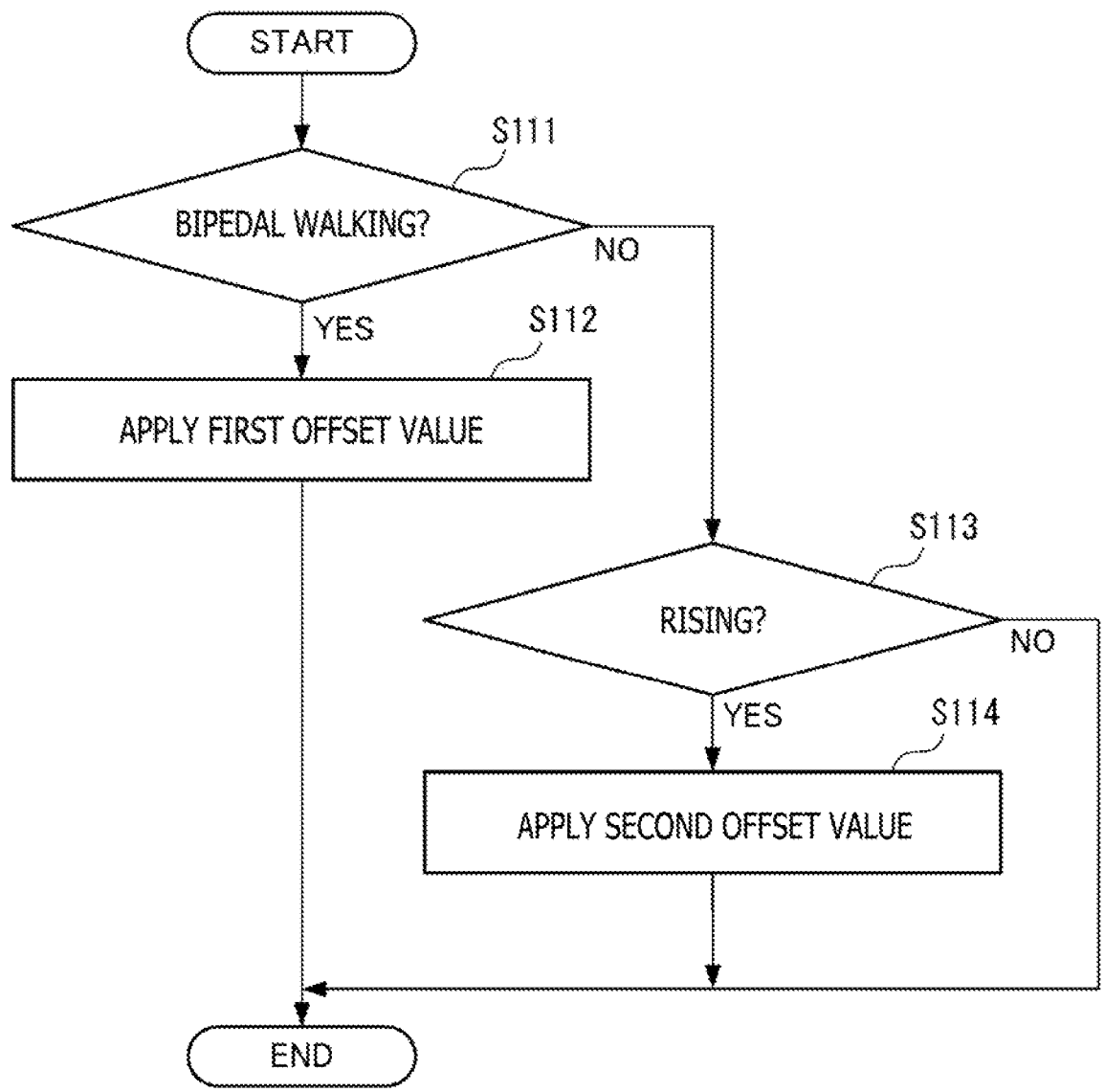
FIG. 15 is a flowchart depicting an example of a concrete procedure for selectively applying the plurality of offset values in one embodiment of the present invention.

FIG. 15 is a flowchart depicting an example of a concrete procedure for selectively applying a plurality of offset values in one embodiment of the present invention. Incidentally, suppose that in the illustrated processing, the first offset value $V_{OFFSET1}$ for bipedal walking and the second offset value $V_{OFFSET2}$ for rising are determined in advance by performing the setting procedure as illustrated above in FIG. 13 for each of the first offset value $V_{OFFSET1}$ and the second offset value $V_{OFFSET2}$, and are stored in the ROM 113 or the external memory 114. In addition, suppose that processing of recognizing the rotational angle θ of the joint portion 130 after applying each of the offset values is similar to the processing illustrated in FIG. 13.

First, when a bipedal walking pattern is selected as a control pattern of the robot 10 (step S111), the CPU 111 applies the first offset value $V_{OFFSET1}$ (step S112). Thus, during the bipedal walking operation of the robot 10, the CPU 111 recognizes the rotational angle θ from the output voltage V of the potentiometer 155 according to the function $f(θ)_2$ to which the first offset value $V_{OFFSET1}$ is applied.

When a rising pattern is selected as a control pattern of the robot 10 (step S113), on the other hand, the CPU 111 applies the second offset value $V_{OFFSET2}$ (step S114). Thus, during the rising operation of the robot 10, the CPU 111 recognizes the rotational angle θ from the output voltage V of the potentiometer 155 according to the function $f(θ)_3$ to which the second offset value $V_{OFFSET2}$ is applied.

When neither of the bipedal walking pattern or the rising pattern is selected as a control pattern of the robot 10 as a result of the determination in step S111 or S113 described above, the CPU 111 recognizes the rotational angle θ from the output voltage V of the potentiometer 155 according to the function $f(θ)_1$ to which no offset value is applied.

With the processing as described above, in critical situations in a plurality of operations of the robot 10, the selective application of the plurality of offset values enables the CPU 111 to recognize the rotational angle θ accurately, and control the operation of the robot 10 appropriately by a relatively simple control of compensating for a difference between the ideal value of the rotational angle and the actually occurring rotational angle θ.

Incidentally, with regard to the operation of the robot 10, an operation of bipedal walking and an operation of rising from a state in which the robot 10 is seated or toppled over have been illustrated in the above description. However, the operation of the robot 10 is not limited to such examples. In addition, critical situations in the respective operations are not limited to examples in the above description. For example, a critical situation in bipedal walking may be defined as a situation in which a ZMP is on a boundary line of a stable region. In addition, the above-described examples are examples in which mainly the rotational angles at the joint portions of the leg portions 105L and 105R and the foot portions 106L and 106R affect a result of operation of the robot 10. However, there can be a case where the rotational angles at the joint portions of the arm portions 103L and 103R and the hand portions 104L and 104R affect a result of operation of the robot 10. For example, in an operation of grasping an object of a known size, the object can be grasped while a force exerted on the object is reduced to a necessary minimum by accurately controlling the rotational angle θ in the grasping situation. In addition, in an operation when the robot 10 reproduces an arbitrary programmed motion, the motion can be reproduced without causing interference between parts of the robot 10 by accurately controlling the rotational angle θ in a situation in which there is a possibility that the parts of the robot 10 interfere with each other, such, for example, as a situation in which both arms are made to intersect each other or the like.

In addition, in the example described with reference to FIG. 15 described above, the operation of the robot 10 includes the first operation (bipedal walking) and the second operation (rising), and the offset value includes the first offset value ($V_{OFFSET1}$) corresponding to a critical situation in the first operation and the second offset value ($V_{OFFSET2}$) corresponding to a critical situation in the second operation. However, relation between the operation of the robot 10 and the critical situation in the operation and the offset value is not limited to such an example. For example, in a single operation of the robot 10, there may be a first critical situation and a second critical situation, and a first offset value and a second offset value corresponding to the respective critical situations may be set.

In addition, the above description has been made of an example in which the offset value $V_{OFFSET}$ is applied to a result of calibration of the potentiometer 155 as a sensor that detects the rotational angle θ in the joint portion 130 of the robot 10. However, a similar configuration may be applied to a sensor that detects another state quantity of the robot 10. For example, it can be useful to apply an offset value set so as to compensate for a difference between an estimated value and an actual value in a critical situation occurring in the operation of the robot 10, for example, to various kinds of sensors in which relation between state quantities detected by the sensors and the detected values of the sensors is not necessarily linear as described with reference to FIG. 11, and calibration is therefore necessary to convert the detected values to the estimated values of the state quantities.

Illustrative embodiments of the present invention have been described above. Incidentally, the configurations of the embodiments described above can be implemented independently of each other or in combination with each other. Specifically, for example, the joint structure as described with reference to FIG. 7 can be implemented independent of the application of the offset value as described with reference to FIG. 12. Also in the example of the joint structure, the application thereof in the leg portions 105L and 105R of the robot 10 as depicted in FIG. 8A and FIG. 8B and the application thereof in the arm portions 103L and 103R of the robot 10 as depicted in FIG. 9A and FIG. 9B may both be implemented, or either the application thereof in the leg portions 105L and 105R of the robot 10 as depicted in FIG. 8A and FIG. 8B or the application thereof in the arm portions 103L and 103R of the robot 10 as depicted in FIG. 9A and FIG. 9B may be implemented.

In addition, the above description has been made by generically illustrating the joint portion 130 of the robot 10 or illustrating a part of the joint portions (for example, the crotch roll joint portion 134L_R). However, the structure or control as described can be applied in each of the joint portions of the robot 10 as described with reference to FIG. 1 according to the operation of the robot 10 and control for realizing the operation. In addition, the joint configuration of the robot 10 depicted in FIG. 1 is an example, and various other joint configurations are also possible. In addition, robots according to other embodiments of the present invention are not limited to humanoid robots such as the robot 10 depicted in FIG. 1 and the like, but can be various kinds of robots that have a joint portion and in which there is a critical situation in an operation realized by control of the joint portion such that the joint portion is subjected to an effect of a backlash.

A few embodiments of the present invention have been described above in detail with reference to the accompanying drawings. However, the present invention is not limited to such examples. It is obvious that a person having an ordinary knowledge in the technical field of the present invention could conceive of various changes or modifications within the scope of technical concepts described in claims. It is therefore to be understood that these changes or modifications also naturally fall within the technical scope of the present invention.

REFERENCE SIGNS LIST

10 . . . Robot, 101 . . . Head portion, 102 . . . Main body portion, 103L, 103R . . . Arm portion, 104L, 104R . . . Hand portion, 105L, 105R . . . Leg portion, 106L, 106R . . . Foot portion, 110 . . . Control device, 111 . . . CPU, 113 . . . ROM, 114 . . . External memory, 115 . . . Bus interface, 116 . . . Conversion function, 117 . . . Offset value, 130 . . . Joint portion, 130A . . . First part, 130B . . . Second part, 140A . . . Main body side link, 140B . . . Distal side link, 150 . . . Motor, 151 . . . Servo circuit, 152 . . . Driver, 153 . . . Encoder, 154 . . . Driving force transmitting mechanism, 155 . . . Potentiometer, 156 . . . A/D converter circuit, 160 . . . Joint structure, 161, 161A . . . Tension spring, 162A . . . Coupling member, 163B . . . Solenoid actuator.

The invention claimed is:

1. A control device for a robot, the control device comprising a processor configured to carry out actions, comprising:

obtaining a signal indicating detected values from a sensor detecting a state quantity of the robot, where the state quantity includes rotational angles of a joint portion of the robot;

converting the detected values to estimated values of the state quantity according to a conversion function obtained by calibration of the sensor, where the conversion function produces estimated values that deviate to varying degrees from actual values representing actual rotational angles of a joint portion;

determining whether the operation of the robot is in a critical situation that is vulnerable to malfunction resulting from the deviation of the estimated values from the actual values;

computing offset values compensating for the deviations in the estimated values and the actual values; and applying the offset values to change the estimated values when the determination is in the affirmative that the operation of the robot is in a critical situation.

2. The control device according to claim 1, wherein the offset values are applied in a limited manner in the critical situation.

3. The control device according to claim 1, wherein
the operation of the robot includes a first operation and a second operation, and
the offset values include first offset values corresponding to a critical situation in the first operation and second offset values corresponding to a critical situation in the second operation.

4. The control device according to claim 1, wherein
the critical situation includes a first situation and a second situation, and
the offset values include first offset values corresponding to the first situation and second offset values corresponding to the second situation.

5. The control device according to claim 1, wherein the processor computes the offset values by:
a first procedure of controlling the operation of the robot according to the estimated values converted without the offset value being applied, and
a second procedure of computing the offset values on a basis of a difference between a result of control in the first procedure and an ideal result.

6. The control device according to claim 5, wherein the result of the control is a posture of the robot, the posture being detected by an inertial measurement unit included in the robot.

7. The control device according to claim 5, wherein the processor periodically performs the computing procedure.

8. The control device according to claim 1, wherein the operation of the robot includes bipedal walking.

9. The control device according to claim 8, wherein the critical situation includes a situation in which the robot is supported by one leg in the bipedal walking.

10. The control device according to claim 1, wherein the sensor includes a potentiometer attached to the joint portion.

11. A control method for a robot, the control method comprising:
obtaining a signal indicating detected values from a sensor detecting a state quantity of the robot, where the state quantity includes rotational angles of a joint portion of the robot;
converting the detected values to estimated values of the state quantity according to a conversion function obtained by calibration of the sensor, where the conversion function produces estimated values that deviate to varying degrees from actual values representing actual rotational angles of a joint portion;
determining whether the operation of the robot is in a critical situation that is vulnerable to malfunction resulting from the deviation of the estimated values from the actual values;
computing offset values compensating for the deviations in the estimated values and the actual values; and
applying the offset values to change the estimated values when the determination is in the affirmative that the operation of the robot is in a critical situation.

12. A non-transitory, computer readable storage medium containing a control program for a robot, the control program, which when executed by a processor included in the robot, causes the processor to carry out actions, comprising:
obtaining a signal indicating detected values from a sensor detecting a state quantity of the robot, where the state quantity includes rotational angles of a joint portion of the robot;
converting the detected values to estimated values of the state quantity according to a conversion function obtained by calibration of the sensor, where the conversion function produces estimated values that deviate to varying degrees from actual values representing actual rotational angles of a joint portion;
determining whether the operation of the robot is in a critical situation that is vulnerable to malfunction resulting from the deviation of the estimated values from the actual values;
computing offset values compensating for the deviations in the estimated values and the actual values; and
applying the offset values to change the estimated values when the determination is in the affirmative that the operation of the robot is in a critical situation.

* * * * *